US009622192B2

(12) United States Patent
Ji

(10) Patent No.: US 9,622,192 B2
(45) Date of Patent: Apr. 11, 2017

(54) VIRTUAL SCHEDULING IN HETEROGENEOUS NETWORKS

(75) Inventor: Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1706 days.

(21) Appl. No.: 12/360,544

(22) Filed: Jan. 27, 2009

(65) Prior Publication Data

US 2009/0196174 A1 Aug. 6, 2009

Related U.S. Application Data

(60) Provisional application No. 61/025,515, filed on Feb. 1, 2008.

(51) Int. Cl.
*H04W 40/00* (2009.01)
*H04W 72/00* (2009.01)
(Continued)

(52) U.S. Cl.
CPC ......... *H04W 52/244* (2013.01); *H04L 1/0025* (2013.01); *H04L 1/0003* (2013.01); *H04L 1/0006* (2013.01); *H04L 1/0009* (2013.01); *H04L 1/06* (2013.01); *H04W 28/16* (2013.01); *H04W 48/10* (2013.01); *H04W 72/082* (2013.01)

(58) Field of Classification Search
CPC ... H04L 1/0025; H04L 1/0003; H04L 1/0006; H04L 1/0009; H04L 1/06; H04W 52/244; H04W 72/082; H04W 28/16; H04W 48/10
USPC .... 370/431, 230.1, 329, 331, 338, 341, 468; 455/446, 436, 450
See application file for complete search history.

(56) References Cited

U.S. PATENT DOCUMENTS 5,822,693 A * 10/1998 Harrison .................... 455/432.1
2005/0037771 A1* 2/2005 Tiedemann ........... H04W 16/00
455/453

(Continued)

FOREIGN PATENT DOCUMENTS

CN 1538669 A 10/2004
EP 0802692 A2 10/1997
(Continued)

OTHER PUBLICATIONS

International Search Report and Written Opinion—PCT/US2009/032294—ISA/EPO—Jun. 4, 2009.
Taiwan Search Report—TW098103296—TIPO—Mar. 16, 2012.

*Primary Examiner* — Luat Phung
(74) *Attorney, Agent, or Firm* — Ashish L. Patel

(57) ABSTRACT

Providing for virtual management of wireless resources in a mobile communication environment is described herein. By way of example, access terminals in the communication environment can maintain connections with nearby network transmitters and report factors pertinent to wireless scheduling to a central entity, such as a macro base station. The macro base station can employ those factors in improving wireless communications for other serving cells within or near to a macro coverage area served by the macro base station. By maintaining information pertinent to prevailing wireless conditions, quality of service requirements, pilot signal reports, mobility management considerations, and so on, of transmissions within the cell, significant interference reduction can be implemented for the macro coverage area, or nearby coverage areas.

47 Claims, 15 Drawing Sheets

(51) Int. Cl.
*G08C 15/00* (2006.01)
*H04W 52/24* (2009.01)
*H04L 1/00* (2006.01)
*H04L 1/06* (2006.01)
*H04W 28/16* (2009.01)
*H04W 48/10* (2009.01)
*H04W 72/08* (2009.01)

(56) References Cited

U.S. PATENT DOCUMENTS

| | | |
|---|---|---|
| 2005/0059408 A1 | 3/2005 | Tiedemann et al. |
| 2005/0085269 A1 | 4/2005 | Buljore et al. |
| 2006/0251119 A1* | 11/2006 | Ramesh .................. 370/468 |
| 2007/0211749 A1* | 9/2007 | Benveniste ............. 370/445 |
| 2007/0211757 A1* | 9/2007 | Oyman .................... 370/468 |
| 2007/0213067 A1* | 9/2007 | Li et al. .................. 455/444 |
| 2008/0026763 A1 | 1/2008 | Van Rensburg et al. |
| 2008/0285477 A1 | 11/2008 | Kuroda et al. |
| 2009/0005005 A1 | 1/2009 | Forstall et al. |
| 2009/0092122 A1* | 4/2009 | Czaja et al. ............. 370/350 |
| 2009/0196245 A1 | 8/2009 | Ji |
| 2013/0070646 A1* | 3/2013 | Myers et al. ............ 370/255 |

FOREIGN PATENT DOCUMENTS

| | | |
|---|---|---|
| EP | 1460867 A1 | 9/2004 |
| JP | H0865727 A | 3/1996 |
| JP | H09312875 A | 12/1997 |
| JP | 10042356 A | 2/1998 |
| JP | H11275646 A | 10/1999 |
| JP | 2001513970 A | 9/2001 |
| JP | 2002027538 A | 1/2002 |
| JP | 2005033536 A | 2/2005 |
| JP | 2006157528 A | 6/2006 |
| JP | 2006287601 A | 10/2006 |
| JP | 2007243623 A | 9/2007 |
| JP | 2009520404 A | 5/2009 |
| KR | 2007097683 A | 10/2007 |
| KR | 20070108250 A | 11/2007 |
| RU | 2144208 C1 | 1/2000 |
| TW | I243622 B | 11/2005 |
| WO | WO9709807 A1 | 3/1997 |
| WO | WO-9809465 A1 | 3/1998 |
| WO | WO9839939 A2 | 9/1998 |
| WO | WO2006118393 A2 | 11/2006 |
| WO | WO2007023787 A1 | 3/2007 |
| WO | WO2007065272 A1 | 6/2007 |
| WO | WO-2007078691 A1 | 7/2007 |
| WO | WO2007103062 A1 | 9/2007 |
| WO | WO-2009099843 A1 | 8/2009 |

* cited by examiner

VIRTUAL SCHEDULING IN HETEROGENEOUS NETWORKS

CLAIM OF PRIORITY UNDER 35 U.S.C §119

The present Application for Patent claims priority to U.S. Provisional Application No. 61/025,515 entitled SCHEDULING METHOD AND APPARATUS IN A COMMUNICATION NETWORK filed Feb. 1, 2008, assigned to the assignee hereof and hereby expressly incorporated by reference herein.

REFERENCE TO CO-PENDING APPLICATION FOR PATENT

The present Application for Patent is related to co-pending U.S. patent application Ser. No. 12/360,548 "VIRTUAL SCHEDULING IN HETEROGENEOUS NETWORKS", by Tingfang Ji, filed concurrently herewith, assigned to the assignee hereof, and expressly incorporated by reference herein.

BACKGROUND

I. Field

The following relates generally to wireless communication, and more specifically to resource scheduling for wireless communication.

II. Background

Wireless communication systems are widely deployed to provide various types of communication content such as, e.g., voice content, data content, and so on. Typical wireless communication systems can be multiple-access systems capable of supporting communication with multiple users by sharing available system resources (e.g., bandwidth, transmit power). Examples of such multiple-access systems can include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems can simultaneously support communication for multiple mobile devices. Each mobile device can communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations can be established via single-input single-output (SISO) systems, multiple-input single-output (MISO) systems, multiple-input multiple-output (MIMO) systems, and so forth.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

Wireless messages are typically sub-divided in time, frequency, according to codes, and so on, to convey information. For instance forward link messages comprise at least one time segment (e.g., a time slot, superframe, etc., of various lengths of time) segmented into one or more preambles and several time sub-segments (e.g., time subslots, time frames). The preamble carries acquisition and control information, while the various other time frames carry traffic, such as voice information pertinent to a voice call, data packets pertinent to a data call or data session, or the like. Acquisition information can be utilized by mobile terminals within a given mobile network cell to identify transmitting base stations within the sector. Control channel information provides commands and other instructions for decoding received signals.

In various mobile communication systems (e.g., ultra mobile broadband [UMB], third generation partnership project [3GPP] long term evolution [LTE—or just LTE]), preambles or similar structures can similar information as described above, or different information. For instance, a preamble in some systems can carry synchronization or acquisition pilots to identify a remote transmitter and establish timing for decoding functions. In addition, the preamble can carry control information enabling a remote terminal to search for a cell at power-up, determine initial parameters of a cell necessary for making handoff decisions, establishing communication with a network, and demodulating non-control channels. Other functions can include specifying formats of traffic channels for some wireless systems. Typically, a preamble is set apart from a traffic-related portion of a wireless signal to facilitate distinction of application-related information and control information at a receiver. Thus, the receiver can monitor control portions to identify whether a signal contains traffic pertinent to a receiving device, without having to monitor the traffic portions themselves. Because the control portion is typically only a small fraction of the total signal, receiver devices can significantly reduce processing requirements and power consumption by monitoring a signal preamble to determine whether relevant information is contained in the signal. Employing control channels for wireless signaling therefore leads to more effective communication, as well as improved mobility by extending battery life for mobile devices.

In a planned deployment of wireless access networks, air signal interference can result from transmissions by access points (e.g., base stations) as well as access terminals. Interference within a particular cell can be caused by access points or access terminals in neighboring cells, for instance. Typically, planned deployments are managed by positioning base stations according to transmission power and expected interference. However, interference can still occur between the transmitters, especially when devices utilize high power transmissions. To reduce interference, interference reduction signals can be utilized within an access network. A base station receiving an interference reduction signal can reduce its transmit power or transmit power of access terminals (ATs) served by the base station. However, where unplanned or semi-planned wireless access point deployments exist, additional interference reduction mechanisms can be helpful for reducing interference from transmitters whose location or transmit power are not precisely known by the access network.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for virtual management of wireless resources in a mobile communication environment. Access terminals (ATs) in the communication environment can maintain connections with nearby network transmitters and report factors pertinent to wireless scheduling to a central entity, such as a macro base station. The macro base station can employ those factors in improving wireless communications for other serving cells within or near to a macro coverage area served by the macro base station. By maintaining information pertinent to prevailing wireless conditions, quality of service (QoS) requirements, pilot signal reports, mobility management considerations, and so on, of transmissions within the cell, significant interference reduction can be implemented for the macro coverage area, or nearby coverage areas.

According to other aspects of the subject disclosure, an AT can be configured to monitor wireless transmissions of multiple network access points (APs) in range of the AT. Particularly, the AT can monitor control channel or acquisition pilot signals of a cell serving the AT. In some aspects, data pertinent to interference management for the serving cell is bundled into a resource reporting message and provided to a macro base station. The AT can further obtain a network assignment block (NAB) message from the macro base station. The NAB can be based on channel quality conditions, expected interference, transmission strength, QoS, or like considerations within the serving cell and neighboring cells of a wireless network (reported to the macro base station by ATs within such neighboring cells). Accordingly, the NAB can provide improved communications for the serving cells and neighboring cells based on management of wireless conditions and traffic conditions of such cells.

In other aspects, the subject disclosure provides for virtual scheduling of multiple-antenna communication. Such communication can include multiple input (MI)—including multiple input single output (MISO), multiple output (MO)—including single input multiple output (SIMO), or multiple input multiple output (MIMO) communications. The multiple-antenna communication can be implemented by an AT in conjunction with one or more other ATs (e.g., via a peer-to-peer link), wireless relays or repeaters, or with a neighboring cell, for instance. Transmission or reception parameters involved in associated with multiple-antenna communication (e.g., timing parameters, transmit power parameters, decoding parameters, filtering parameters, channel estimation parameters, and so on) can be provided by a base station employing wireless conditions and traffic QoS requirements of nearby cells, as discussed above. Accordingly, improved interference mitigation and potentially improved beamforming gain can result from the multiple-antenna communication based on the knowledge of such conditions and requirements. Such result can be particularly advantageous, for instance, a scheduling base station or serving cell might not have reliable or sufficient information pertaining to surrounding cells.

In at least one aspect of the subject disclosure, provided is a method for wireless communication in a wireless network. The method can comprise employing a set of processors to generate a network assignment block (NAB) for a neighboring cell of the wireless network. The instructions can be executed to cause the processor(s) to assign a downlink communication for the neighboring cell and include the assignment in the NAB. Additionally, the instructions can be executed to cause the processor(s) to initiate transmission of the NAB over-the-air (OTA) to an AT in a coverage area of the wireless network. Furthermore, the method can comprise saving the instructions in a memory.

In one or more other aspects, disclosed is an apparatus for coordinated communications in a wireless communication environment. The apparatus can comprise at least one antenna for sending and receiving wireless communications. Furthermore, the apparatus can comprise a set of processors for implementing coordinated wireless communication scheduling. Additionally, the processor(s) can be configured to assign a downlink communication for a neighboring cell of a wireless network and to encode the downlink assignment into a NAB. Furthermore, the processor(s) can be configured to employ the at least one antenna to forward the NAB to the neighboring cell OTA via an AT served by the wireless network.

In still other aspects of the subject disclosure, provided is an apparatus for wireless communication in a wireless network. The apparatus can comprise means for processing instruction code to generate a NAB for a neighboring cell of the wireless network. Additionally, the processing instructions can cause the means for processing to assign a downlink transmission for the neighboring cell and include the downlink assignment in the NAB and to initiate transmission of the NAB OTA to an AT in a coverage area of the wireless network. Moreover, the apparatus can comprise means for storing the instruction code in memory.

In yet other aspects, disclosed is at least one processor configured for wireless communication in a wireless network. The processor(s) can comprise a first module for processing instruction code to generate a NAB for a neighboring cell of the wireless network. The processor(s) can further comprise a second module for assigning a downlink transmission for the neighboring cell and including the downlink assignment in the NAB. Moreover, the processor(s) can comprise a third module for initiating transmission of the assignment OTA to an AT in the coverage area of the wireless network.

According to one or more additional aspects, provided is a computer program product comprising a computer-readable medium. The computer-readable medium can comprise a first set of codes for causing a computer to generate a NAB for a neighboring cell of a wireless network. Additionally, the computer-readable medium can comprise a second set of codes for causing the computer to assign a downlink communication for the neighboring cell and include the downlink assignment in the NAB. Moreover, the computer-readable medium can comprise a third set of codes for causing the computer to transmit the NAB OTA to an AT in a coverage area of the wireless network.

Further to the above, disclosed is a method for facilitating wireless communication in a wireless network. The method can comprise employing at least one processor to analyze respective wireless signals of a serving base station and of a non-serving cell of the wireless network. In addition, the method can comprise employing at least one antenna to obtain a NAB from the second wireless device, the NAB specifies downlink wireless communication scheduling configured for a cell of the wireless network. The method can further comprise employing the at least one antenna to transmit the downlink wireless communication scheduling to the serving base station or a non-serving cell of the wireless network to facilitate AT-directed scheduling of the wireless communication.

In other aspects of the subject disclosure, provided is an apparatus for facilitating wireless communication in a wireless network. The apparatus can comprise a set of antennas for sending and receiving wireless signals and a processor for analyzing respective wireless signals of a serving base station and of a non-serving cell of the wireless network. Furthermore, the apparatus can comprise receiver that obtains a NAB from the second wireless device, the NAB specifies downlink wireless communication scheduling configured for the serving base station. In addition, the apparatus can comprise a reporting module that transmits the downlink wireless communication scheduling to the serving base station or a non-serving cell of the wireless network.

In one or more other aspects, disclosed is an apparatus for facilitating wireless communication in a wireless network. The apparatus can comprise means for employing at least one processor to analyze respective wireless signals of a serving base station and of a non-serving cell of the heterogeneous AP network. The apparatus can also comprise means for employing at least one antenna to obtain a NAB from the second wireless device, the NAB specifies downlink wireless communication scheduling configured for the serving cell. Moreover, the apparatus can comprise means for employing the at least one antenna to transmit the downlink wireless communication scheduling to the serving base station or a non-serving cell of the wireless network to facilitate AT-directed scheduling of the wireless communication.

According to still other aspects, disclosed is at least one processor for facilitating wireless communication in a wireless network. The processor(s) can comprise a first module for analyzing respective wireless signals of a serving base station and of a non-serving cell of the wireless network. Further, the processor(s) can comprise a second module for obtaining a NAB from the second wireless device, the NAB specifies downlink communication scheduling configured for a cell of the wireless network. In addition to the foregoing, the processor(s) can comprise a third module for transmitting the downlink wireless communication scheduling to the serving base station or a non-serving cell of the wireless network to facilitate AT-directed scheduling of the wireless communication.

In at least one other aspect of the subject disclosure, provided is a computer program product comprising a computer-readable medium. The computer-readable medium can comprise a first set of codes for causing a computer to analyze respective wireless signals of a serving base station and of a non-serving cell of a wireless network. Furthermore, the computer-readable medium can comprise a second set of codes for causing the computer to obtain a NAB from the second wireless device, the NAB specifies downlink wireless communication scheduling configured for a cell of the wireless network. In addition, the computer-readable medium can comprise a third set of codes for causing the computer to transmit the downlink wireless communication scheduling to the serving base station or a non-serving cell of the wireless network to facilitate AT-directed scheduling of the wireless communication.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
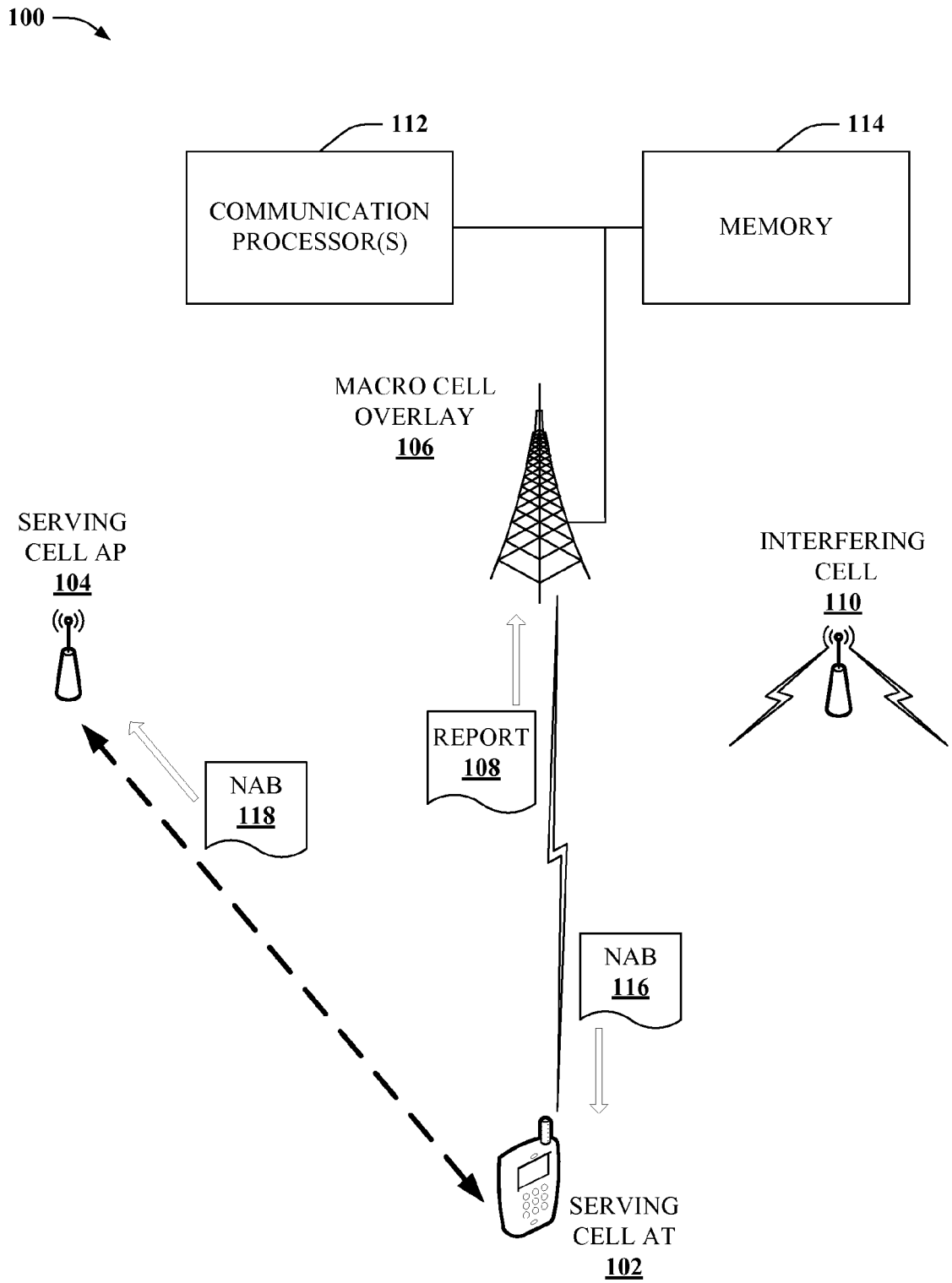
FIG. 1 depicts a block diagram of an example system for providing virtual scheduling in a heterogeneous network according to aspects disclosed herein.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In addition, various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of any other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of virtual implementation of multi-cell cooperation for a heterogeneous mobile access network (AN). One skilled in the art should appreciate that similar techniques could apply to other communication environments.

As utilized in the subject disclosure, the term heterogeneous network refers to a network of disparate types of base stations deployed within a common or similar bandwidth. The disparate types of base stations can be categorized based on different transmit powers, different association types, different processing capability, different number of transmit and receive antennas, whether base stations are inter-connected with a backhaul connection (e.g. a relay base station), or the like, or combinations thereof. A typical macro base station that transmits up to 50 watts versus a typical pico base station that transmits at 1 watt is an example of transmit power disparity. Base stations having different association types can include general access base stations, which provide network access to most or all wireless terminals having a suitable subscription, as compared with restricted access base stations, which provide network connectivity only to a limited subset of terminals having a subscription.

Wireless communication systems implement information exchange between wireless nodes by employing various signaling mechanisms. In one instance, a base station can be employed to transmit pilot signals that establish timing sequences and identify signal source and network associated with the source, among other things. A remote wireless node, such as a user terminal (UT) or access terminal (AT), can decode a pilot signal to obtain information necessary to establish basic communication with the base station. Additional data, such as a wireless frequency or set of frequencies, time slot(s), symbol codes and the like can be conveyed in control signals transmitted from the base station. This data can be utilized to establish wireless resources over which traffic data, carrying user information, such as voice communication or data communication, can be conveyed between the base station and UT.

One significant problem in such a system is interference between wireless transmissions of nearby wireless nodes. Interference can reduce reception quality, retard throughput, or render communication ineffective when severe. Accordingly, planned base station deployments are ideal in that wireless nodes can be placed at a suitable distance to mitigate interference. The distance can be determined, for instance, on a combined transmit range of two such nodes (measured, e.g., within a certain decibel [dB] level). Additionally, beamforming techniques can be employed to reduce interference in particular directions with respect to a node.

In a dense or semi/unplanned wireless deployment, forward link (FL) and reverse link (RL) interference in a cell can be dominated by wireless access points (APs) and ATs, respectively, in neighboring cells. Furthermore, in a heterogeneous wireless AN, relatively low power nodes can exist in range of relatively high power nodes, exacerbating the problem of interference. To illustrate, an AP typically transmits at a power related to a geographic area covered by the AP. Such geographic areas can be termed cells, which can vary in size. For instance, a macro-cell can be larger than a micro-cell, pico-cell, femto-cell, etc. Thus, a wireless AP serving the macro-cell can typically transmit at higher power than an AP serving a micro-cell, pico-cell, or femto-cell. For planned networks, APs are positioned an appropriate distance from each other to mitigate interference. Where placement of APs is only semi-planned or unplanned, significant interference can result in cells served by neighboring APs. One straightforward example is that transmissions of a high power macro-cell AP can pose significant interference for lower power APs close to the macro-cell. However, the reverse can also be true. If a terminal served by the macro-cell is also close to a pico-cell, for instance, the pico can be a significant interferer for the macro. Moreover, restricted association APs (e.g., privately owned femto cell APs) can compound this problem. If a terminal is very close to a restricted AP, and is not allowed to connect to such AP, the restricted AP can generate significant interference for the terminal, especially where the nearest general access AP is a great distance from the terminal.

To reduce interference in a wireless network (including, e.g., a semi-planned/un-planned network or heterogeneous access type network), the subject disclosure provides for aggregating wireless conditions of nearby cells at a common network node. To facilitate the aggregation, ATs can be configured to maintain wireless links with multiple nodes, and submit information from one node (e.g. a serving node) to the common node. This arrangement can be especially beneficial in a semi or un-planned deployment, where a network might not have full or reliable information pertaining to all neighboring node deployments. As an example, owner-deployed femto nodes can be placed independently by various owners, often with little or no knowledge of a network operator. Accordingly, the network can have information pertaining to deployment of some nodes (e.g. other macro nodes, or operator-deployed micro, pico or femto deployed nodes), but not others. However, by monitoring wireless signals of nearby nodes, ATs within a cell can help to fill some of the gaps. As utilized herein, a serving node or AP denotes an access point that provides traffic services to an AT (such as voice, HTTP, FTP, etc), or establishes control links for the AT, or the like.

Wireless communication for a wireless AN can be classified as forward link communication (e.g., communication from an AP to an AT) and reverse link communication (e.g., communication from the AT to the AP). On the forward link, an AT can experience interference from neighboring APs in neighboring cells. For instance, a signal received at an AT from a serving AP can be co-mingled with signals received from the neighboring APs. Where the neighboring APs are higher power transmitters (e.g., macro-cell APs) than the serving AP (e.g. a pico-cell AP), the forward link interference can significantly deteriorate wireless communication for the AT. Accordingly, management of signal strength and/or channel resources can provide significant benefits for the AT served by a lower power wireless AP.

As a particular example of the foregoing, it can be beneficial for an AT to select an AP with a small path loss as a serving AP. This occurs because a low path loss signal loses less energy a given distance from a transmitting AP, and is received with higher power at a receiver, than a high path loss signal traveling the same distance. Thus, the transmitting AP can utilize less power to transmit the low path loss signal and still achieve similar performance at the receiver. Transmitting at lower power causes smaller interference, on average, to a network, which benefits APs and ATs alike. Despite the benefits of low path loss, a selected AP might have a much lower transmit power than a distant, higher path loss AP transmitting at much higher power. In this case, a signal from the low path loss AP can be significantly weaker as received at the AT than the high path loss AP signal, resulting in high interference. In an alternative scenario, the wireless AP with strong forward link signal strength can be a private AP that does not recognize the AT. Such an AP can deny access to a back-end network (e.g., a mobile communication network, the Internet, or the like) for the AT. In such a case, the AT could be forced to connect to a distant wireless AP having a much weaker signal as received at the AT.

To mitigate problems with inter-cell interference, a common AP (which can include a macro base station, but can also include other APs such as micro, pico or even femto base stations in some circumstances, e.g., when the femto has access to network resources), can provide coordinated scheduling among neighboring cells in a particular coverage area served by the common AP. The common AP can employ network information uploaded to the network by various APs within the coverage area, as well as information reported to the common AP by one or more ATs within or near the coverage area. From the perspective of interference, such information can include transmit power for FL or RL transmissions and prevailing FL or RL interference conditions (broadcast by an AP or calculated at an AT, respectively). In addition, the information can comprise QoS commitments of various FL or RL data flows reported by wireless nodes within or near the coverage area. In at least one aspect, the information can further comprise mobility management information, such as an active set of APs maintained by the AT.

Based on the network and AT-submitted information, the common AP can determine suitable wireless transmission scheduling for APs and ATs within or near the coverage area. The scheduling can include transmit power for various transmissions, based on prevailing interference levels. Additionally, the scheduling can specify one or more wireless signal resources (e.g., time slots and frequency sub-bands, or suitable fractions thereof, orthogonal frequency multiple access [OFDM] symbols, code division multiple access [CDMA] codes, or combinations thereof) for various transmissions. In at least one aspect of the subject disclosure, the scheduling can comprise network-directed mobility instructions, directing an AT to hand-off to a neighboring AP, for instance, or to add the neighboring AP to an active mobility set.

In addition to the foregoing, the wireless transmission scheduling can establish priority levels for various transmission scheduling. Priority can be based, for instance, on QoS commitments for different types of traffic, different types of wireless subscription services, or the like. Priority can be utilized by a recipient AP or AT to determine whether to obey, modify or ignore the scheduling provided by the common AP. Such a determination can be based on a corresponding priority of traffic managed by the AP or AT and existence of a collision in priorities, current interference levels, QoS commitments, type of traffic, and so on.

Wireless transmission scheduling determined by the common AP can be bundled into a scheduling message that can provide uplink (or RL) or downlink (or FL) scheduling for APs and ATs in a particular coverage area of the common AP. The scheduling message can specify transmission resources (e.g., timeslot, frequency, symbols, codes of a wireless signal) spatial multiplexing mode, transmit diversity mode, antenna coefficients, transmit power, modulation and coding scheme, or the like, for one or more wireless nodes, and for uplink or downlink communication. In some aspects of the subject disclosure, the scheduling message can comprise a network assignment block (NAB) message. However, it should be appreciated that a transmission route for the NAB or scheduling message need not be pre-established from source to target prior to transmission. Rather, the scheduling message/NAB can be routed real-time to one or more target nodes, by a receiving node or sequence of such nodes (e.g. ATs or wireless repeaters within the coverage area) based on serving or interfering cell IDs specified in the message, or based on an ID of one or more ATs targeted by the message, or a combination thereof. Thus, as one particular example in the case of UL receive diversity in a cellular network (e.g., a CDMA network), an AT could forward the assignment/grant message from the serving cell to a pre-established macro diversity set to enable inter-cell cooperation for UL communications. Where the term NAB is utilized in the subject description and appended claims, it is to be understood that a NAB refers to a general scheduling message adhering to the above properties, not necessarily to a NAB having pre-established path routing prior to transmission of the NAB, although the general scheduling message can include the latter interpretation in suitable instances.

Once generated, the NAB can be forwarded to nodes within or near the coverage area served by the common AP. In one aspect of the subject disclosure, the common AP can employ a backhaul network to transmit the NAB to other APs. In other aspects, the NAB can be routed to the other APs over-the-air (OTA) via one or more ATs or wireless relays in or near the coverage area. OTA routing can be beneficial where a backhaul connection does not exist, or where the backhaul has relatively poor throughput, for instance. In still other aspects, the NAB can be transmitted directly to an AT via a unicast message, for implementation by the AT, or for forwarding to an AP serving the AT.

Further to the above, the NAB can specify identities of nodes targeted for the scheduling. Such identities can include an ID of a target AT and an ID of an AP serving such AT. The recipient AT can decode the NAB to determine whether the message is intended for the recipient AT. If so, such AT can analyze the message and forward the NAB to the serving AP.

In at least one aspect, the recipient AT can inform the common AP of status of FL or RL transmissions with a network assignment status (NAS) message, network assignment indication (NAI) channel or message, or the like. The NAS/NAI message can be transmitted to the common AP over dedicated control channels, such as an acknowledgement (ACK) channel, request (REQ) channel, or similar control channel. Alternatively, the NAS message can be submitted to the common AP via a wireless relay station, or generated by the serving AP and submitted over a backhaul connection. In other aspects, the AT can employ the NAS/NAI channel or message to forward a NAB to a serving AP. Alternatively, or in addition, the AT can employ the NAS/NAI channel or message to forward the NAB to a neighboring cell, for instance where the NAB specifies an ID of the neighboring cell or an AT served by the neighboring cell.

According to further aspects of the subject disclosure, the NAB can comprise an ID of an interfering AP(s) or interfering AT(s), on FL or RL channels, respectively. A priority for the NAB can additionally be utilized for contention mediation with other traffic that is not visible to the common AP. An interfering node (or serving node) that decodes the NAB with its ID can determine not to interfere with the NAB scheduling (e.g., by changing wireless resources) or lower interference on specified resources based on priority and wireless conditions. If the interfering node is an AT, such node can also relay the NAB to its serving AP for network-managed FL and RL transmission scheduling. In at least one aspect, the AT can decode and analyze the NAB and schedule or assist in scheduling RL transmissions from scheduling information included in the NAB, and from wireless conditions of a serving cell or surrounding cells. Likewise, if the interfering node is an AP, the interfering AP can determine to avoid (e.g., by selecting other resources) or reduce interference (e.g. by lowering transmit power) on specified resources based on priority and prevailing wireless conditions.

In at least one additional aspect of the subject disclosure, the common AP can employ the network and AT-submitted wireless information to facilitate virtual multiple-antenna communication for a set of wireless nodes configured for such communication. Because MIMO communication involves estimation of channel conditions for achieving beamforming gain, the centralized scheduler has an advantage in calculating multiple-antenna communication parameters based on the wireless information, particularly in heterogeneous AP networks. In such circumstances, the common AP can calculate MIMO communication parameters for multiple nodes participating in the virtual multiple-antenna communication. The parameters can be submitted in the NAB, along with an assignment associating respective parameters with respective nodes. Accordingly, the nodes can implement such communication based on the centralized data compiled by the common AP, and obtain advantages in throughput available through such centralized scheduling.

Referring now to the figures, FIG. 1 illustrates a block diagram of an example system 100 that provides virtual scheduling for wireless communications. System 100 comprises at least one serving cell AT 102 served by a serving cell AP 104. The AT 102 can monitor wireless transmissions of nearby APs (104, 106, 110) of the system 100 and provide interference-related information to a common base station (106) to facilitate the virtual scheduling. In particular, where system 100 comprises one or more APs unknown or unreliably known to the common base station, the interference-related information can result in significant interference reduction based on the virtual scheduling, even on a packet-by-packet basis.

The serving cell AT 102 can comprise any suitable wireless communication device configured for wireless communication with a wireless network. Examples can include a mobile device (e.g., a mobile phone, laptop, personal digital assistant, smart-phone, etc.) or a fixed wireless device (e.g., a computer, fixed wireless station, fixed relay, and so on). Particularly, the serving cell AT 102 is configured to monitor control channel information of at least two APs of the system 100. Monitored control channels can include FL control channels, or RL feedback channels (including, e.g. ACK, REQ, channel quality indicator [CQI], automated request [ARQ], hybrid ARQ [HARQ], and so forth). The APs can comprise base stations, such as macro, micro, pico or femto base station, or other suitable wireless network access points. Typically, at least one of the monitored APs is the serving AP 104. Another suitable monitored AP is a macro cell overlay 106, serving as a common scheduling AP in system 100. Additionally, however, the AT can monitor control channel information of interfering APs 110 in a cell(s) neighboring the serving cell AP 104.

By monitoring control channel information, AT 102 can identify current wireless channel conditions of a wireless node. Such conditions can include RL or FL transmit power assignments (e.g., for ATs or APs, respectively), interference at an AP (104, 106, 110), or the like. AT 102 can bundle one or more such conditions into a cell reporting message 108 and deliver the message 108 to the macro cell overlay 106. In some aspects, the report 108 can be initiated by the AT 102 upon receiving a FL signal from an AP 104, 106, 110. Alternatively, the report 108 can be triggered by an AP, such as the serving AP 104 or the macro overlay AP 106. In at least one aspect, the report 108 can be submitted periodically, or based on wireless conditions dropping below a threshold level.

Upon receiving the cell reporting message 108, the macro overlay AP 106 can store the report 108 in memory 114, and employ a set of communication processors 112 to decode the report 108. Information pertaining to cell wireless conditions is extracted and stored in memory 114. Memory 114 can be, for instance, a database for managing current wireless conditions, as well as changes in such conditions over time. Furthermore, the database (114) can facilitate statistical analysis based on the stored wireless information, to estimate future conditions based on various dynamic circumstances (e.g., number of ATs in a coverage area, QoS of transmissions, traffic load, scattering conditions, and so on).

In addition to the above, the processors 112 can be employed to calculate suitable control or traffic channel resources to mitigate interference among the APs 104, 106, 110. Additionally, the processors 112 can be employed to calculate suitable transmission power levels for FL or RL transmissions in or near the macro cell. The calculations can be based on data submitted and stored at a wireless network database (not depicted), provided in the report 108 or like reports submitted by other ATs in the macro cell, submitted by the APs 104, 110 (e.g., directly through a backhaul connection between such APs 104, 110 and the macro AP 106, or routed via an AT 102), or obtained by another suitable method.

Once determined, channel resources or transmission power levels are bundled into a NAB message 116 and forwarded to the AT 102 OTA. In at least one aspect, the NAB message is unicast to the AT 102. Unicast messaging can be advantageous for scheduling pertinent to the AT 102, the serving AP 104, or other ATs served by the serving AP 104. In other aspects, for instance where the scheduling targets nodes in multiple cells, the NAB message can be transmitted in a broadcast message to all ATs (102) in range of the macro cell.

Upon receiving the NAB message 116, AT 102 decodes the message and determines if the message 116 contains scheduling information pertinent to the AT 102 or serving AP 104. The determination can be based on whether the NAB message 116 includes an ID of a node within the serving cell (104). If the NAB message is pertinent to the AT 102, the AT 102 can decode the message 116, or forward the message 116 to the serving AP 104 for AP-directed scheduling. If the NAB message is not pertinent to the AT 102, the message 116 is forwarded instead to an AP (104, 110) identified in the message 116.

In at least some aspects, the NAB 116 can include priority information for one or more resource or transmission power instructions determined by the macro cell AP 106. Based on the priority information, a recipient node (102, 104, 110) can determine whether to obey, modify or ignore the instructions. Such a determination can be based on whether priority collisions occur with existing traffic involving the recipient node (102, 104, 110), for instance, current wireless conditions, or the like.

In at least one additional aspect, the NAB message 116 can comprise mobility management instructions for the AT 102. Mobility management can include selection of APs (104, 106, 110) for an active handoff set, or a command to handoff to a different AP (e.g., based on traffic loading, cell interference, or the like). The AT 102 can elect to follow the mobility management instructions, modify the instructions, or ignore the instructions, based on AT configuration or prevailing wireless conditions.

Figure 2:
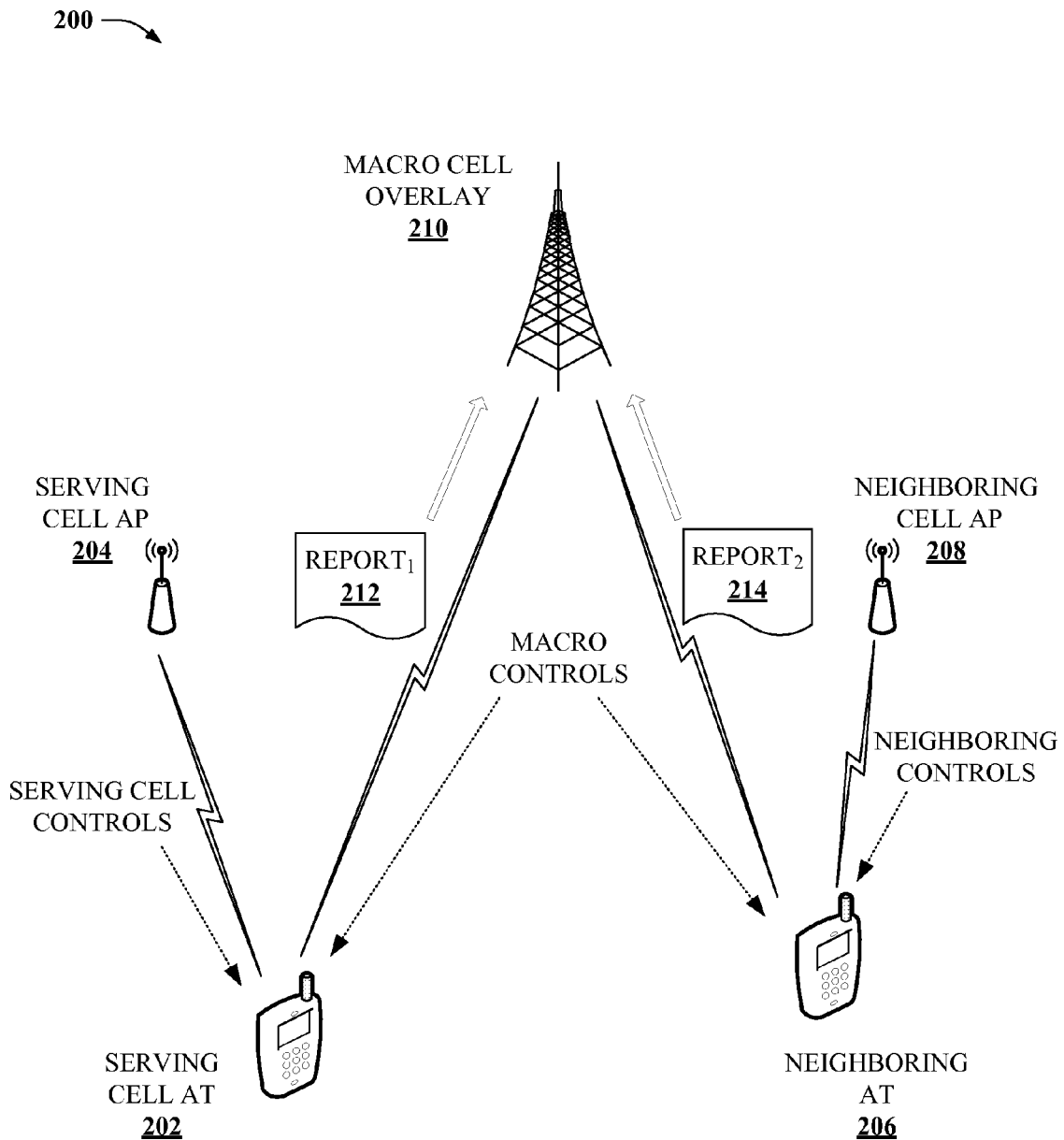
FIG. 2 illustrates a block diagram of an example system for providing wireless conditions for neighboring cells of a network to a common base station.

FIG. 2 depicts a block diagram of an example system 200 that facilitates OTA determination of wireless conditions for a heterogeneous AP network. System 200 comprises an AT 202 within a serving cell (204) of the AP network, and an AT 206 within a neighboring cell (208) of the network. In addition, the network comprises a macro cell 210. Serving and neighboring APs 204, 208 have no direct connection with the macro cell 210. Thus, for instance, the serving and neighboring APs 204, 208 can be femto cells, deployed independently by respective owners of the cells. The respective APs 204, 208, 210 can perform traffic scheduling for a cell(s) which they serve independently of the other APs 204, 208, 210. Accordingly, interference can result between on FL and RL channels, depending on proximity of respective ATs 202, 206 to the various APs 204, 208, 210, as well as on other conditions, such as current transmit strength, path loss, or the like, of various wireless transmissions.

To help mitigate this interference, the ATs 202, 206 can be configured to monitor control channel information of multiple APs within range. Typically, such monitoring will include at least a respective serving AP (204, 208) as well as the macro cell AP 210. By monitoring control channels, the ATs 202, 206 can identify current transmission strengths within respective cells served by the APs 204, 208, 210. Additionally, wireless resource assignments can be identified from the control channels. The ATs 202, 206 are configured to extract the resource or transmission strength information from the control channels and bundle such information in respective cell reporting messages 212, 214. Such messages provide wireless channel conditions for the serving cell and neighboring cell, respectively.

The reporting messages 212, 214 are transmitted to the macro cell 210 on RL wireless resources (e.g., ACK, CQI, ARQ, HARQ, or like channels). The macro cell 210 can decode the respective reports 212, 214 and save the information pertaining to current wireless conditions of the respective cells 204, 208. Accordingly, the macro cell 210 can obtain information pertaining to femto cells that otherwise might not be available from a network supporting the macro cell 210. Based on this information, the macro cell 210 can provide coordinated interference management for FL or RL communication within the macro cell. For instance, the macro can direct AT 202 to employ a first set of wireless resources, while directing the neighboring AT 204 to employ a distinct second set of wireless resources, to avoid interference on RL channels. Likewise, the macro cell 210 can direct the respective APs to employ different sets of resources for FL transmissions, to reduce interference on the FL. Alternatively, or in addition, the macro cell 210 can direct one or more nodes (202, 204, 206, 208) to modify transmit power to reduce interference for neighboring nodes (202, 204, 206, 208). As a result, system 200 can achieve improved interference management even for an evolving deployment of heterogeneous APs (204, 208), in dynamic wireless conditions.

Figure 3:
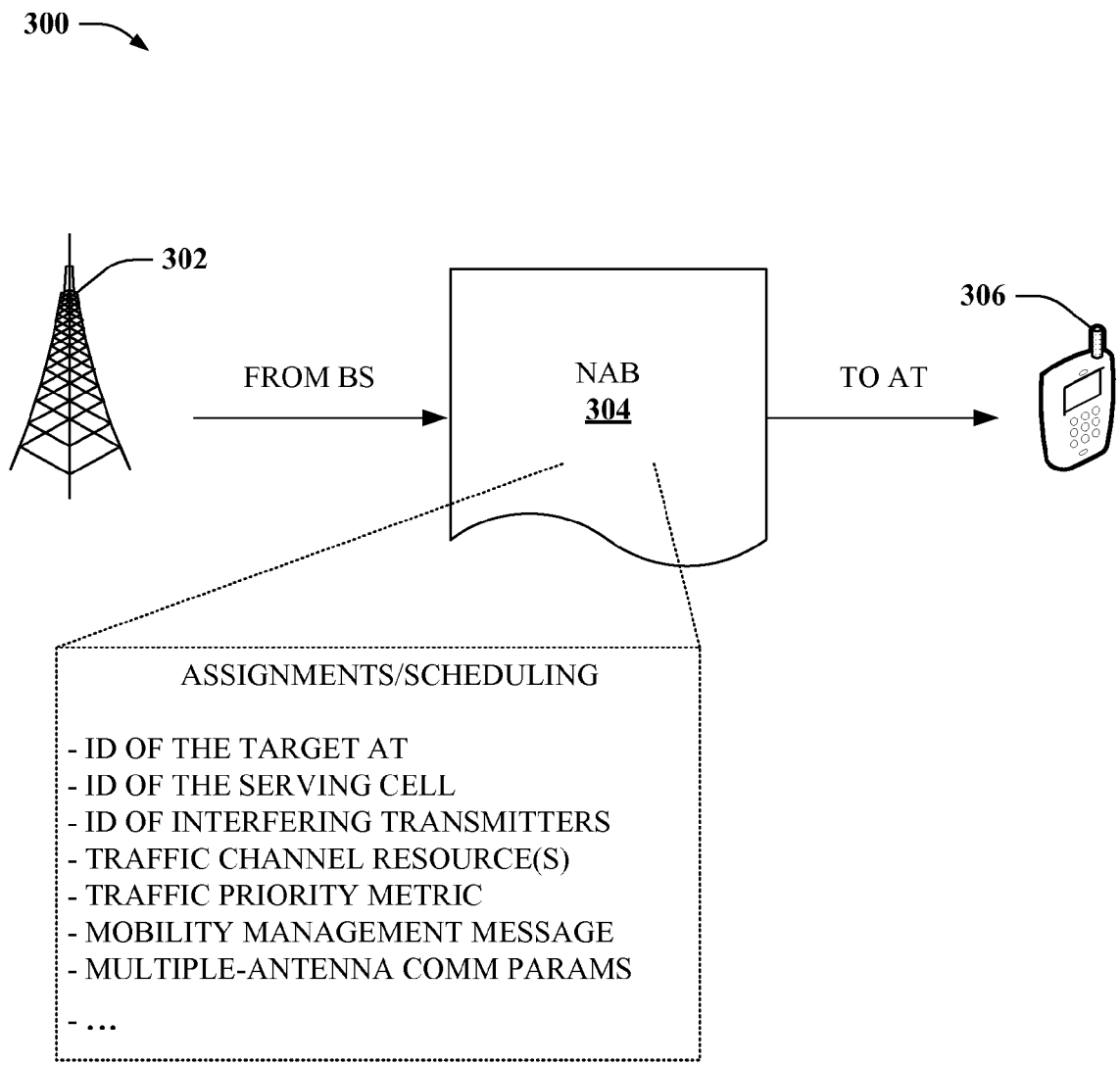
FIG. 3 depicts a block diagram of an example system for providing virtual scheduling to facilitate improved wireless communications.

FIG. 3 depicts a block diagram of an example system 300 for virtual scheduling for wireless communications. System 300 comprises a base station 302 configured to provide wireless scheduling for a cell served by the base station 302, as described herein. To accomplish this goal, the base station 302 calculates suitable channel resources or transmission power levels for a particular AT 306 within the cell. The scheduling information can be compiled into a NAB 304, which is transmitted to the AT 306 on a FL channel employed by the base station 302.

As depicted, the NAB 304 can comprise various information. An ID of the AT 306 can be included in the NAB 304 to identify AT 306 as a scheduling target. In addition, the NAB 304 can comprise an ID of the cell serving AT 306. The serving cell ID enables the AT 306 to determine a target base station (302) for FL scheduling. As depicted by system 300, the serving base station is the node providing the NAB 304. However, if AT 306 hands off to another base station (not depicted), AT 306 can utilize the cell ID to determine whether the NAB 304 is directed toward its current cell or a neighboring cell, for instance.

In addition to AT and base station ID, the NAB 304 can specify an ID of one or more interfering nodes, and traffic priority of such nodes. The NAB 304 can further specify particular control or traffic channel resources to be employed by AT 306, its serving base station (302), or the interfering nodes. Accordingly, AT 306 can identify suitable resources or strength for its own transmissions, based on such data. In at least one aspect, the determination is made with respect to priority levels specified within the NAB 304. Thus, the AT 306 can compare priority level of its own transmissions with that of an interferer. If AT 306 has higher priority, it can increase transmission strength, for instance. Alternatively, or in addition, AT 306 can forward the NAB 304 to an interfering node (e.g., neighboring AP) to facilitate reduced interference on resources employed by AT 306. If AT 306 has lower priority, it can reduce transmission strength, or select a different set of channel resources (e.g., specified in the NAB 304) to avoid interfering with a higher priority node. Determining whether to lower interference or switch resources can be made on priority disparity, as well as current interference conditions associated with respective sets of channel resources.

In at least one further aspect of the subject disclosure, the NAB 304 can include mobility management data for AT 306. Such data can be employed in handoff determinations, selection of an active AP set, or the like. According to still other aspects, the NAB 304 can comprise parameters for multiple-antenna communication between the AT 306 and another node (not depicted). The parameters can indicate a particular channel resource for such communication, as well as respective timing or transmit power for multiple-antenna transmission, or decoding and filtering parameters for multiple-antenna transmission. Due to improved interference available through centralized scheduling as described herein, additional gains can be achieved from the multiple-antenna communication, even in a heterogeneous AP network.

Figure 4:
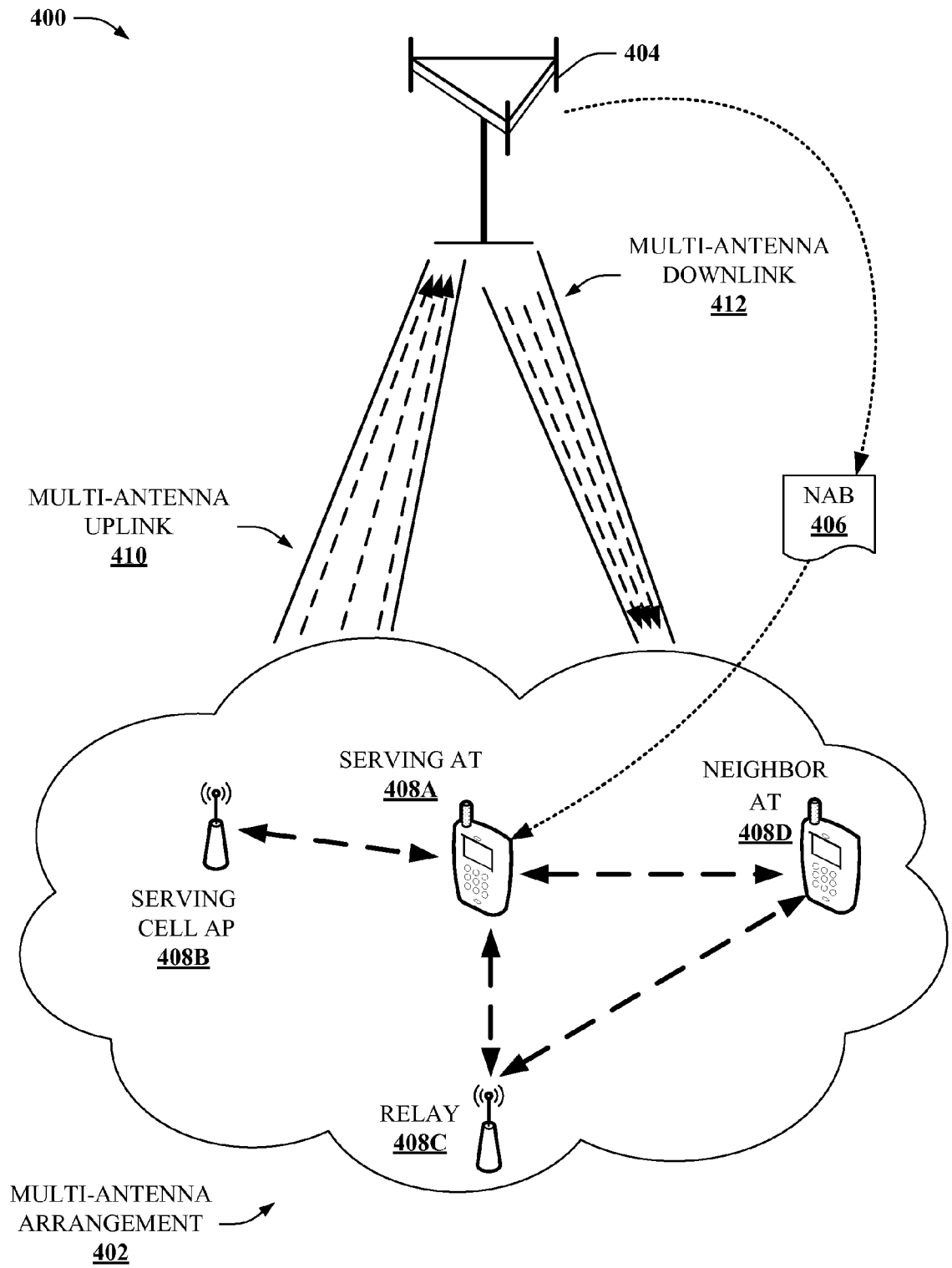
FIG. 4 illustrates a block diagram of an example system providing virtual scheduling for distributed multiple-antenna communication according to further aspects.

FIG. 4 illustrates a block diagram of an example system 400 that provides virtual scheduling for distributed multiple-antenna communication, according to aspects of the subject disclosure. System 400 can comprise a distributed multi-antenna arrangement 402 comprising distributed wireless communication devices 408A, 408B, 408C, 408D (408A-408D). The distributed arrangement 402 can be utilized to implement MIMO, MISO or SIMO communication with a remote wireless transceiver, such as a base station 404. In some aspects, base station 404 comprises a single antenna (for MISO or SIMO communication), whereas in other aspects, base station 404 comprises multiple antennas (for MIMO communication).

As depicted, the multi-antenna arrangement 402 can comprise various types of wireless devices 408A-408D. For instance, the devices 408A-408D can comprise a serving AT 408A within a cell of a serving AP 408B (e.g., a macro, micro, pico or femto AP). Additionally, the devices can comprise one or more wireless relays 408C (e.g., including fixed or mobile relays) and one or more neighboring ATs 408D in cells neighboring the serving cell. Various mechanisms can be utilized by the devices 408A-408D to exchange traffic data or scheduling information to implement multi-antenna communication, distributed among the devices 408A-408D. For instance, one or more peer-to-peer communication links can be employed to communicatively couple peer devices (408A, 408D). Such devices can be configured to transmit and receive on both RL and FL communication channels. Alternatively, a subset of the devices (408A, 408B) can employ typical cellular communication protocols, where at least one device is configured to transmit and receive on both RL and RL channels, to facilitate concurrent transmission or reception with another such device. According to at least one aspect, a wireless repeater 408C can be employed to interface with other devices (408A, 408B, 408D) and facilitate the multiple-antenna communication with at least one other such device.

As described herein, serving AT 408A can monitor transmissions of neighboring wireless nodes (404, 408B, 408C, 408D) and obtain wireless communication conditions reported by the nodes (e.g. interference, transmit strength, transmit/receive resources). Data descriptive of the communication conditions is forwarded by the serving AT 408A to base station 404. Based on such information, the base station 404 can calculate parameters for multiple-antenna transmission or reception by a subset of the devices comprising the distributed multi-antenna arrangement 402. Subsets of the parameters, to be implemented by respective devices (408A-408D) can be associated with respective IDs of the devices (408A-408D). The parameters are then bundled into a NAB message 406 and forwarded OTA to the serving AT 408A (e.g. via unicast message) or broadcast to the distributed arrangement 402. In the former case, the serving AT 408A distributes the NAB (or extracts subsets of the parameters and distributes respective subsets to respective devices 408B, 408C, 408D) among the devices, or to a relay 408C for distribution.

The respective devices 408A-408D can thus receive or extract parameters governing their respective multiple-antenna transmissions/receptions. By employing the parameters, the devices 408A-408D can transmit on like frequencies to implement a multi-antenna uplink 410 with base station 404. Alternatively, or in addition, the devices 408A-408D can receive multi-antenna downlink 412 transmissions, decode and distribute the transmissions to achieve beamforming gain.

Figure 5:
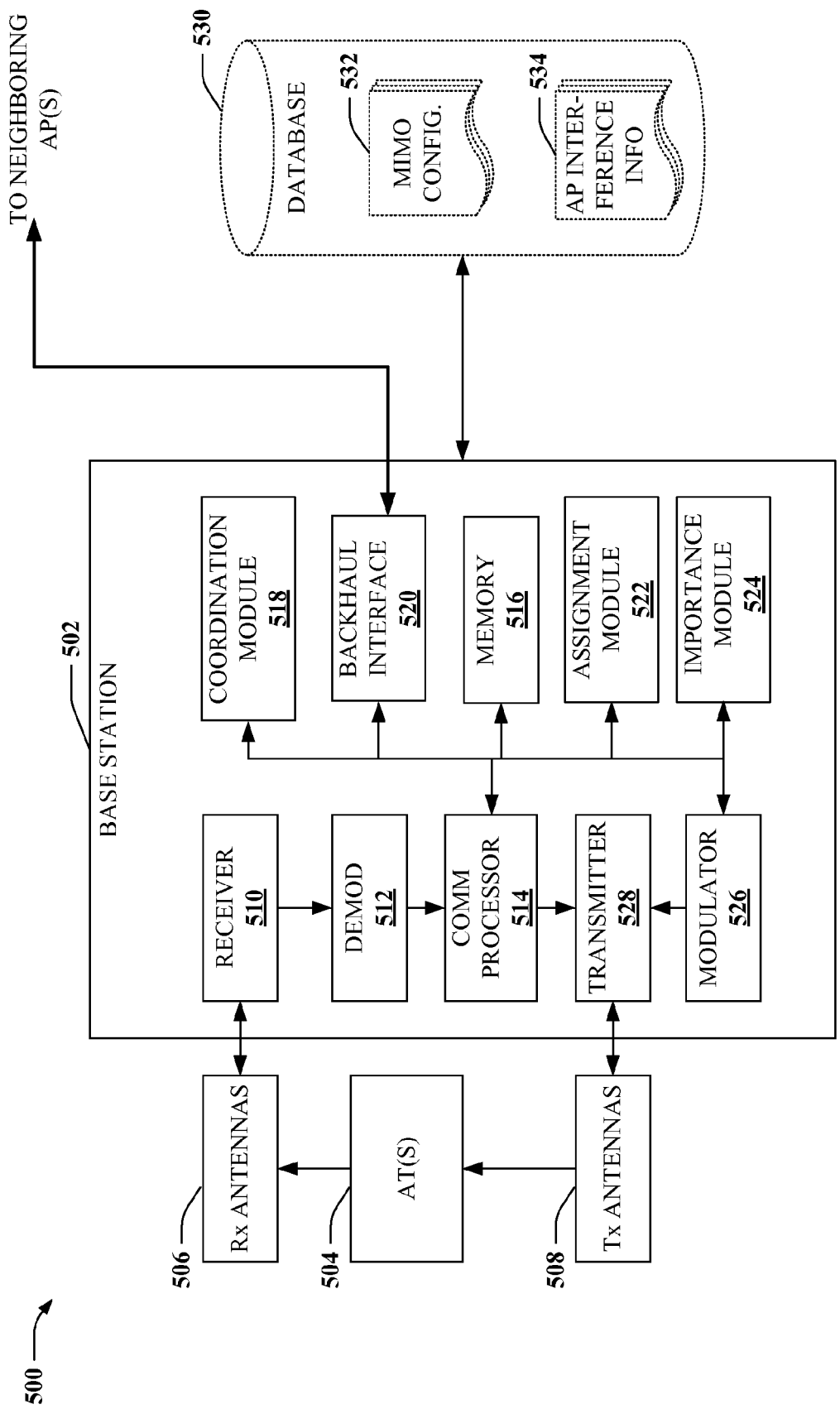
FIG. 5 illustrates a block diagram of a sample system comprising a base station configured to facilitate virtual scheduling in a heterogeneous network.

FIG. 5 depicts a block diagram of an example system 500 according to aspects of the subject disclosure. Specifically, system 500 can comprise a base station 502 configured for virtual scheduling in a heterogeneous access point environment. For instance, base station 502 can be configured to receive cell reporting messages from one or more ATs 504 near to or within a coverage area served by the base station 502. Additionally, the cell reporting messages can comprise wireless channel information pertaining to wireless nodes within the coverage area, and store the wireless channel information in a database 530 coupled to the base station 502. Furthermore, the base station 502 can employ the wireless channel information to schedule transmissions within the coverage area to achieve mitigated interference, as described herein.

Base station 502 (e.g., access point, . . . ) can comprise a receiver 510 that obtains wireless signals from one or more of the ATs 504 through one or more receive antennas 506, and a transmitter 528 that sends coded/modulated wireless signals provided by modulator 526 to the one or more ATs 504 through a transmit antenna(s) 508. Receiver 510 can obtain information from receive antennas 506 and can further comprise a signal recipient (not shown) that receives uplink data transmitted by AT(s) 504. Additionally, receiver 510 is operatively associated with a demodulator 512 that demodulates received information. Demodulated symbols are analyzed by a communication processor 514. Communication processor 514 is coupled to a memory 516 that stores information related to functions provided or implemented by base station 502. In one instance, stored information can comprise protocols for parsing wireless signals and scheduling forward link transmission of base station 502 and reverse link transmissions of the UT(s) 504.

Further to the above, base station 502 can employ the communication processor 514 to generate a NAB message for the ATs 504 or wireless network nodes serving the ATs 504. The NAB message can provide resource scheduling, transmission power levels, or mobility management directions calculated by the processor 514 based on network conditions (534) reported by the ATs 504 or obtained from a network database 530. Additionally, the scheduling, power levels or mobility management can be configured to achieve optimal interference reduction for heterogeneous APs neighboring the base station 502. The NAB message can be submitted to the ATs 504 via broadcast or unicast messaging, or can be submitted to neighboring nodes of the wireless network via a wired or wireless backhaul interface 520, communicatively coupling base station 502 with such nodes.

Additionally, base station 502 can comprise a coordination module 518 for calculating respective parameters for implementing multiple-antenna communication for ATs 504. In at least one aspect, base station 502 can comprise an assignment module 522 that maintains ID information for the ATs 504 and neighboring nodes, obtained from the network database 530 or submitted by the ATs 504. The assignment module 522 can include ID information into the NAB message to identify particular scheduling for particular ATs 504 or neighboring nodes. Furthermore, the assignment module 522 can employ the ID information to differentiate between transmission or reception parameters for respective ATs 504 or neighboring nodes in conjunction with multiple-antenna communication, as described herein. In at least one further aspect, base station 502 can also comprise an importance module 524 determines a priority of respective traffic flows of ATs 504, and specifies at least one priority within the NAB message. The priority can specify relative importance of traffic flows associated with the ATs 504, or traffic flows associated with interfering nodes, or both. Based at least in part on the specified priority, the ATs 504 can determine whether to obey, modify or ignore the scheduling provided by the base station 502.

Figure 6:
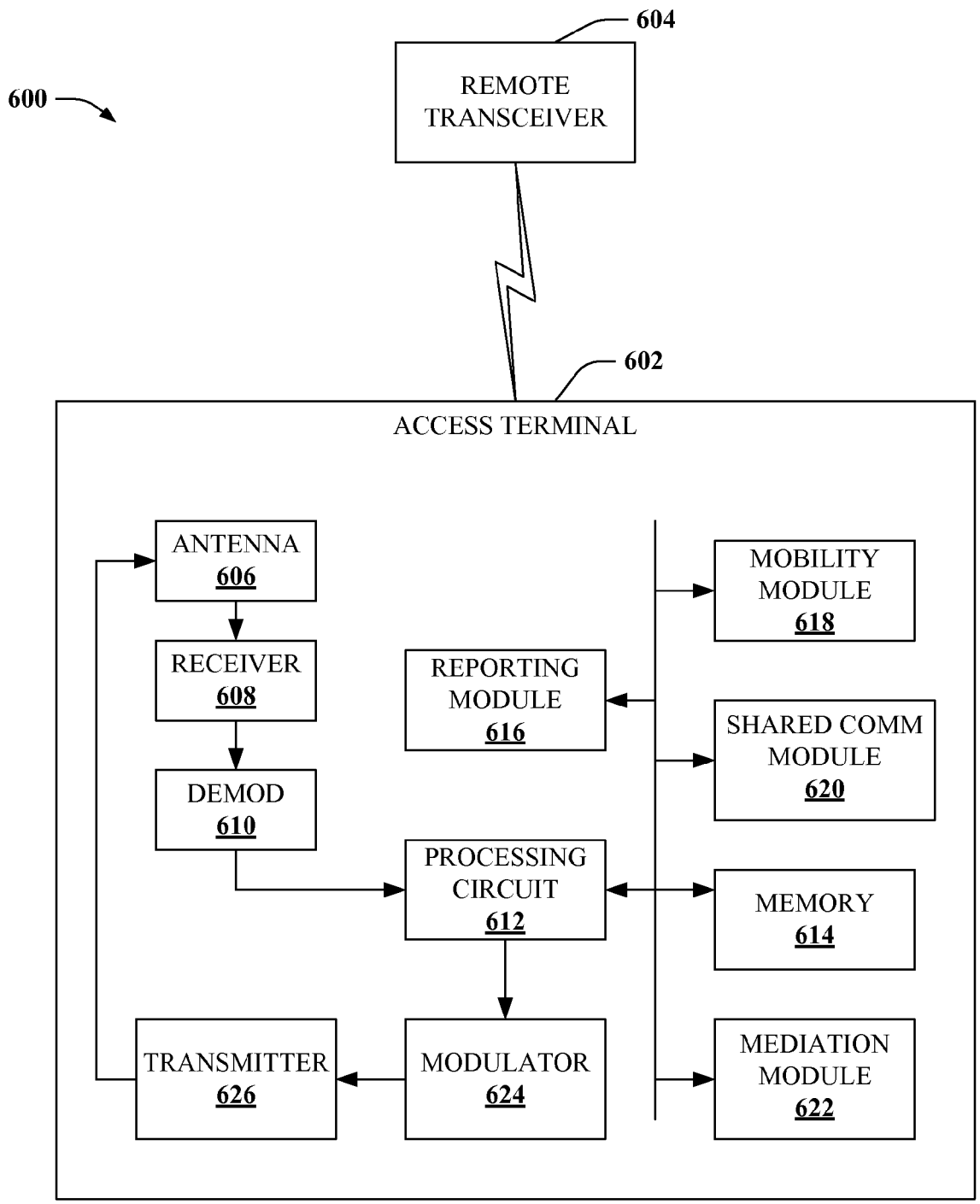
FIG. 6 depicts a block diagram of a sample system comprising an AT configured to facilitate virtual scheduling according to some aspects of the disclosure.

FIG. 6 illustrates a block diagram of a sample system 600 comprising an AT 602 operable to implement aspects of the subject disclosure. AT 602 can be configured to wirelessly couple with one or more remote transceivers 604 (e.g., access point, P-P partner) of a fixed or ad-hoc wireless network. For fixed network communication, AT 602 can receive wireless signals from a base station (504) on a forward link channel and respond with wireless signals on a reverse link channel. In addition, for peer-to-peer (P-P) communication, AT 602 can receive wireless signals from a remote P-P partner (504) on the forward link channel or reverse link channel, and responds with wireless signals on the reverse link channel or forward link channel, respectively. In addition, AT 602 can comprise instructions stored in memory 614 for monitoring control channels of multiple network access points, and reporting wireless condition information to macro base station (604), as described herein.

AT 602 includes at least one antenna 606 (e.g. a wireless transmission/reception interface or group of such interfaces comprising an input/output interface) that receives a signal and receiver(s) 608, which performs typical actions (e.g., filters, amplifies, down-converts, etc.) on the received signal. In general, antenna 606 and transmitter 626 (collectively referred to as a transceiver) can be configured to facilitate wireless data exchange with remote transceiver(s) 604.

Antenna 606 and receiver(s) 608 can also be coupled with a demodulator 610 that can demodulate received symbols and provide such signals to a processing circuit(s) 612 for evaluation. It should be appreciated that processing circuit(s) 612 can control and/or reference one or more components (606, 608, 610, 614, 616, 618, 620, 622, 624, 626) of the AT 602. Further, processing circuit(s) 612 can execute one or more modules, applications, engines, or the like (616, 618, 620, 622) that comprise information or controls pertinent to executing functions of the AT 602. For instance, such functions can include monitoring multiple base station control channels for transmission power levels, scheduled transmission resources, or interference conditions. In addition, functions can include extracting wireless conditions or scheduling information from the control channels, bundling such data into a cell reporting message, receiving a response to the message and determining whether to implement scheduling provided in the response, or like operations, as described herein.

Additionally, the memory 614 of AT 602 is operatively coupled to processing circuit(s) 612. Memory 614 can store data to be transmitted, received, and the like, and instructions suitable to conduct wireless communication with a remote device (504). Specifically, the instructions can be utilized to implement wireless channel reporting, mobility management, traffic priority determinations, or distributed multiple-antenna communication, as described herein. Further, memory 614 can store the modules, applications, engines, etc. (520, 622, 624) executed by processing circuit(s) 612, above.

In at least one aspect, AT 602 can comprise a reporting module 618. Reporting module can be configured to bundle control signal information obtained from received wireless signals by processing circuit 612 into a cell reporting message. Additionally, the reporting module can initiate transmission of the cell reporting message to remote transceiver 604. Additionally, AT 602 can comprise a mobility module 618 that maintains an active set of network APs (604) for mobility management determinations. Alternatively, or in addition, mobility module 618 can analyze pilot report signals of a serving base station (604) and neighboring base stations (not depicted) to determine optimal serving cells in conjunction with handoff determinations. In at least some aspects, the mobility module 618 can include the pilot report signals or active set of APs in the cell reporting message to facilitate network-managed mobility for AT 602.

According to additional aspects, AT 602 can comprise a shared communication module 620 that employs wireless resource scheduling obtained from remote transceiver 604 to implement multiple-antenna communication between the AT 602 and another wireless device (604). For instance, the shared communication module 620 can extract multi-antenna parameters from the resource scheduling to identify parameters pertinent to the AT 602. The shared communication module 620 can then transmit on resources, utilizing timing, based on the parameters to implement multiple-antenna transmission, or decode and filter received communications employing the parameters, to implement multiple-antenna reception. In at least one other aspect, AT 602 can further comprise a mediation module 622 for decoding resource scheduling information and obtaining a priority for traffic flows of the AT 602 or for interfering traffic. Based on the priority, the mediation module 622 can determine whether to obey, modify or ignore the wireless resource scheduling, or a specified transmission power level. Other factors in the determination can include priority collision with the interfering traffic, channel conditions on the resources provided by the resource scheduling, or expected interference at a specified transmit power level.

The aforementioned systems have been described with respect to interaction between several components, modules and/or communication interfaces. It should be appreciated that such systems and components/modules/interfaces can include those components or sub-components specified therein, some of the specified components or sub-components, and/or additional components. For example, a system could include AT 602, base station 502, database 530, and multi-antenna arrangement 402, or a different combination of these or other components. Sub-components could also be implemented as components communicatively coupled to other components rather than included within parent components. Additionally, it should be noted that one or more components could be combined into a single component providing aggregate functionality. For instance, reporting module 616 can include mobility module 618, or vice versa, to facilitate wireless channel reporting and mobility management reporting by way of a single component. The components can also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

In view of the exemplary systems described supra, methodologies that may be implemented in accordance with the disclosed subject matter will be better appreciated with reference to the flow charts of FIGS. 7-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, device in conjunction with a carrier, or storage medium.

Figure 7:
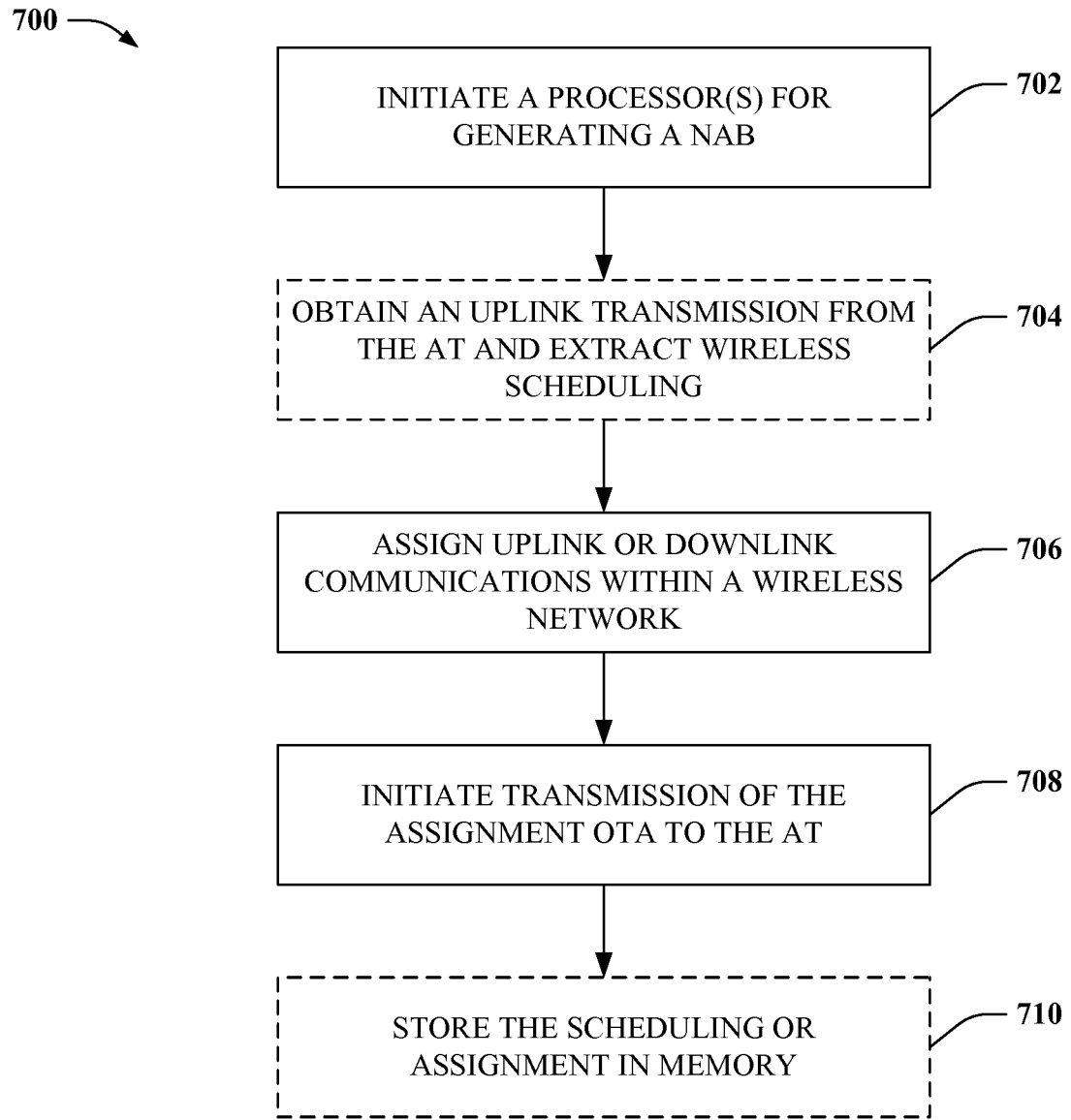
FIG. 7 illustrates a flowchart of an example methodology for providing virtual scheduling in a heterogeneous network according to other aspects.

FIG. 7 depicts a flowchart of an example methodology 700 for providing virtual scheduling in a heterogeneous AP network environment according to aspects of the subject disclosure. At 702, method 700 can initiate a set of processors for generating a NAB for conveying wireless communication assignments. The NAB can be directed toward downlink traffic (e.g., for an AP of a wireless network) or uplink traffic (e.g., for an AT of the wireless network), or both. Additionally, for downlink communication, the communication assignments can be directed toward any cell of the wireless network, any cell excluding cells directly served by a central scheduling apparatus (e.g., an overlay macro base station), or can be restricted to a non-serving cell, with respect to a particular AT or set of ATs (e.g., a cell not within the particular ATs active set). Likewise, for uplink communication, the communication assignments can be directed toward uplink traffic within any cell of the wireless network, toward uplink traffic served by base stations other than the central scheduling apparatus, or can be limited to uplink traffic in non-serving cells, with respect to the centralized scheduler (e.g., cells that do not share an active set with the centralized scheduler, relative to a particular AT or set of ATs).

At 704, method 700 can optionally obtain an uplink transmission from the AT and extract wireless channel conditions, mobility management data, or existing cell scheduling data of the serving AT or a cell neighboring the serving cell from the uplink transmission. At 706, method 700 can assign uplink or downlink communications within the wireless network. The assignment can optionally be based on the extracted information from reference number 704. As discussed above, the uplink or downlink communication can be for any cell of the wireless network, cells other than a cell served by a centralized scheduler generating the assignments, or only cells in which at least one AT does not have the centralized scheduler in an active set. In some aspects, the assignment can be calculated to mitigate interference, provide mobility management, enable uplink or downlink transmit diversity, spatial multiplexing, centralized modulation or coding schemes, or the like, among wireless nodes of the wireless network. In at least one aspect, the extracted information optionally obtained at reference number 704 can be supplemented with network information descriptive of channel conditions for at least one cell. At 708, method 700 can initiate transmission of the assignment OTA to the AT. At 710, method 700 can optionally store the extracted information or assignment in memory.

Figure 8:
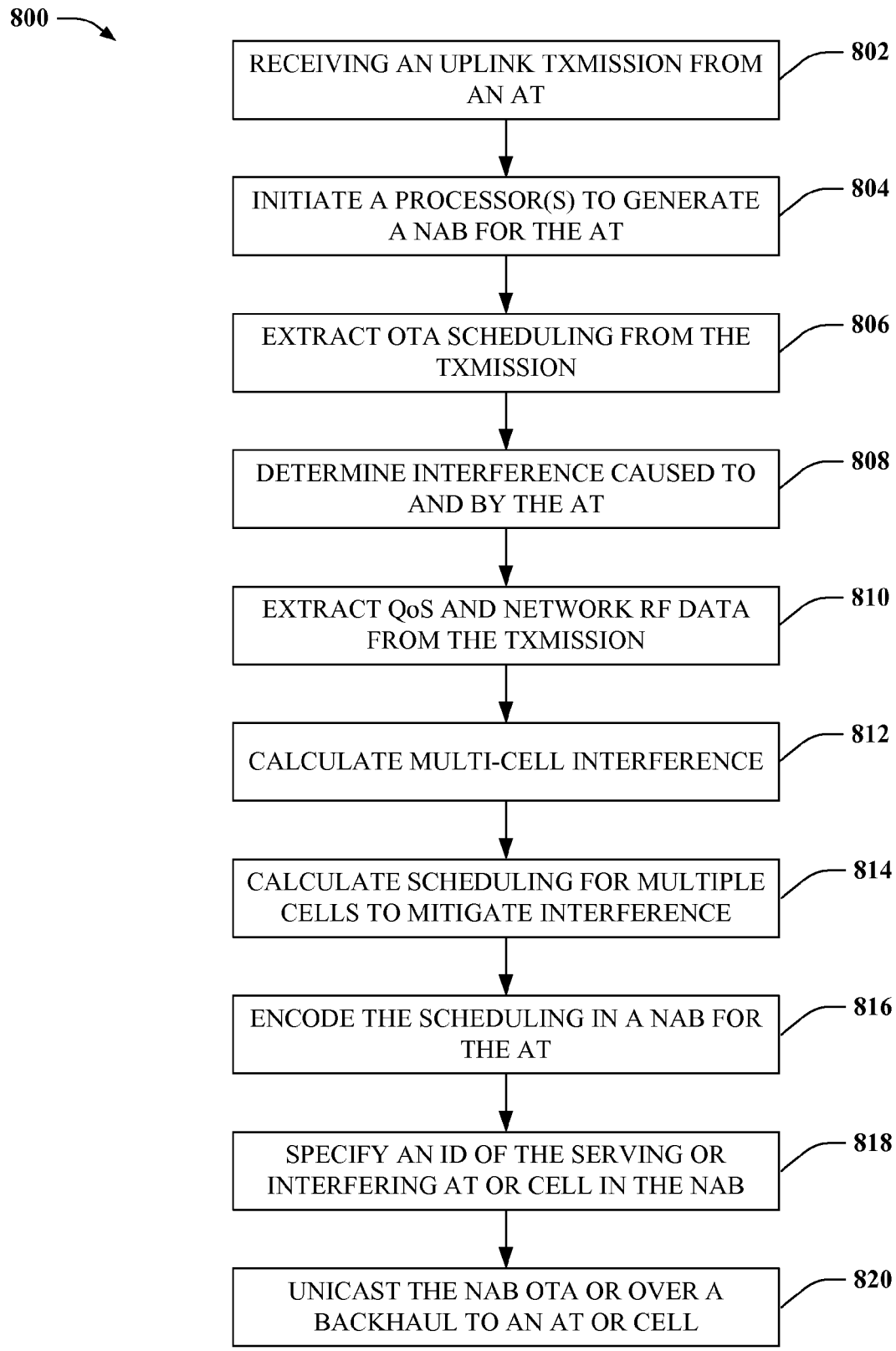
FIG. 8 depicts a flowchart of a sample methodology for implemented improved wireless communications based on virtual scheduling in further aspects.

FIG. 8 illustrates a flowchart of an example methodology 800 for implementing improved communications in heterogeneous networks based on cell reporting by remote terminals. At 802, method 800 can receive an uplink transmission from an AT. At 804, method 800 can initiate a set of processors to generate a NAB message (a scheduling message) for the AT, to facilitate interference mitigation, mobility management, or multiple-antenna communication for the AT, or the like.

At 806, method 800 can extract OTA scheduling information from the uplink transmission. At 808, method 800 can determine interference caused to the AT by neighboring traffic, or caused by the AT to such traffic. At 810, method 800 can extract QoS and network radio frequency data from the transmission. At 812, method 800 can calculate multi-cell interference based on the OTA scheduling information.

At 814, method 800 can calculate scheduling to mitigate interference between traffic flows of the AT and neighboring wireless nodes based on the interference, OTA scheduling information or QoS requirements. At 816, method 800 can encode the calculated scheduling in a NAB message for the AT. At 818, method 800 can specify an ID of the AT or a cell serving the AT in the NAB message. At 820, method 800 can unicast the NAB message OTA to the AT, or submit the NAB message over a wired or wireless backhaul network to the serving cell, to facilitate the reduced interference.

Figure 9:
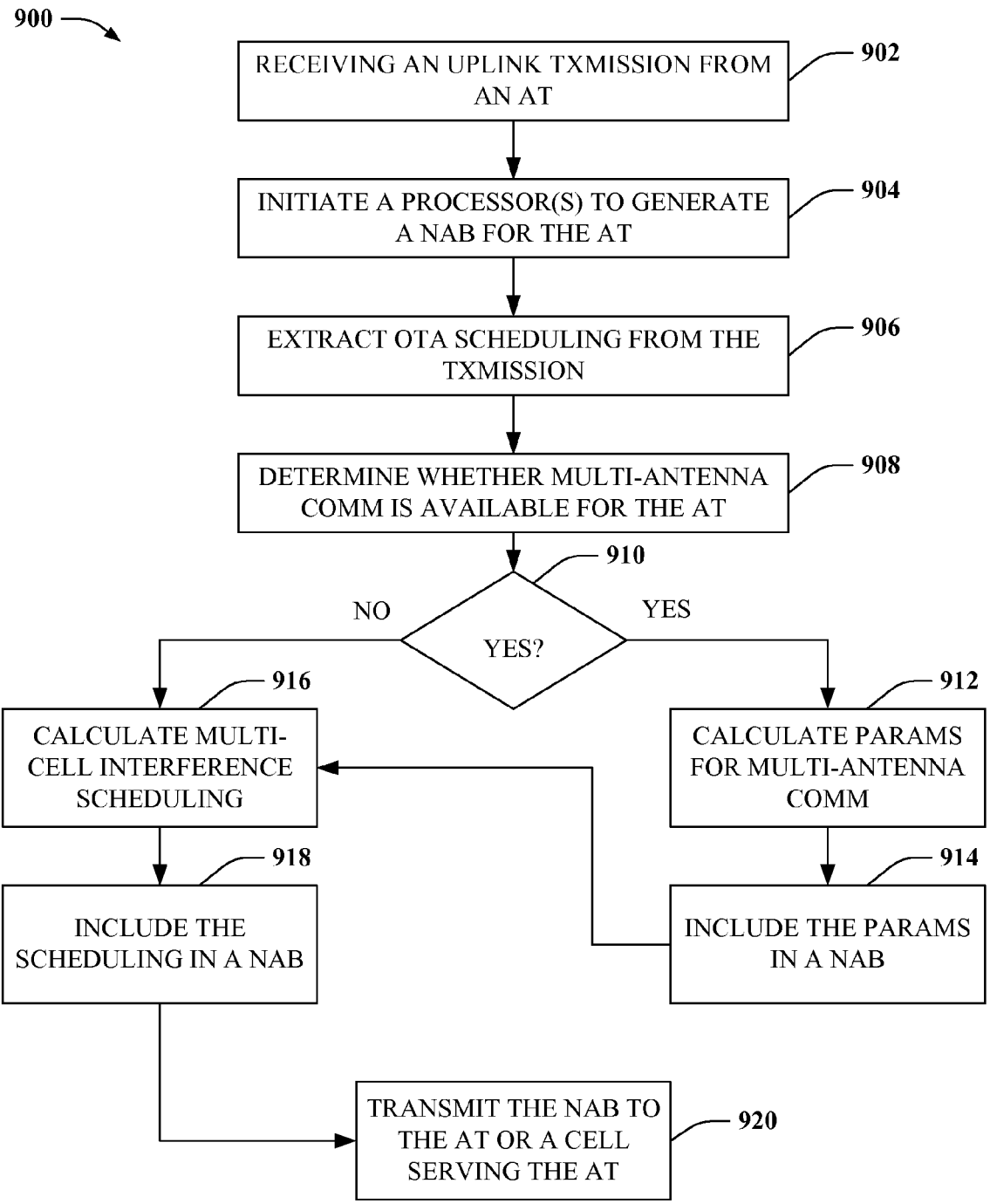
FIG. 9 illustrates a flowchart of a sample methodology for employing virtual scheduling for multiple-antenna communication in a heterogeneous network.

FIG. 9 illustrates a flowchart of an example methodology 900 for implementing virtual scheduling for distributed multiple-antenna communication in a heterogeneous AP network. At 902, method 900 can receive an uplink transmission from an AT. At 904, method 900 can initiate a set of processors to generate a NAB message for the AT. At 906, method 900 can extract OTA scheduling information from the uplink transmission, to determine prevailing interference conditions for the AT. At 908, method 900 can determine whether the AT is configured for multiple-antenna communication, and whether such communication is available to the AT, from the uplink transmission.

At 910, method 900 proceeds to 912 if multiple-antenna communication is available for the AT; otherwise, method 900 proceeds to 916. At 912, method 900 can calculate respective parameters for the multiple-antenna communication for the AT and at least one additional wireless node. At 914, method 900 can include the parameters in the NAB message. Furthermore, the respective parameters can be distinguished by an ID of the AT or a cell serving the AT, or of the additional wireless node.

At 916, method 900 can calculate multi-cell interference scheduling for the AT. At 918, method 900 can include the interference scheduling in the NAB message. At 920, method 900 can broadcast the NAB message to the AT and additional wireless node, unicast the NAB message to the AT, or submit the NAB message to the cell serving the AT over a wired or wireless backhaul network.

Figure 10:
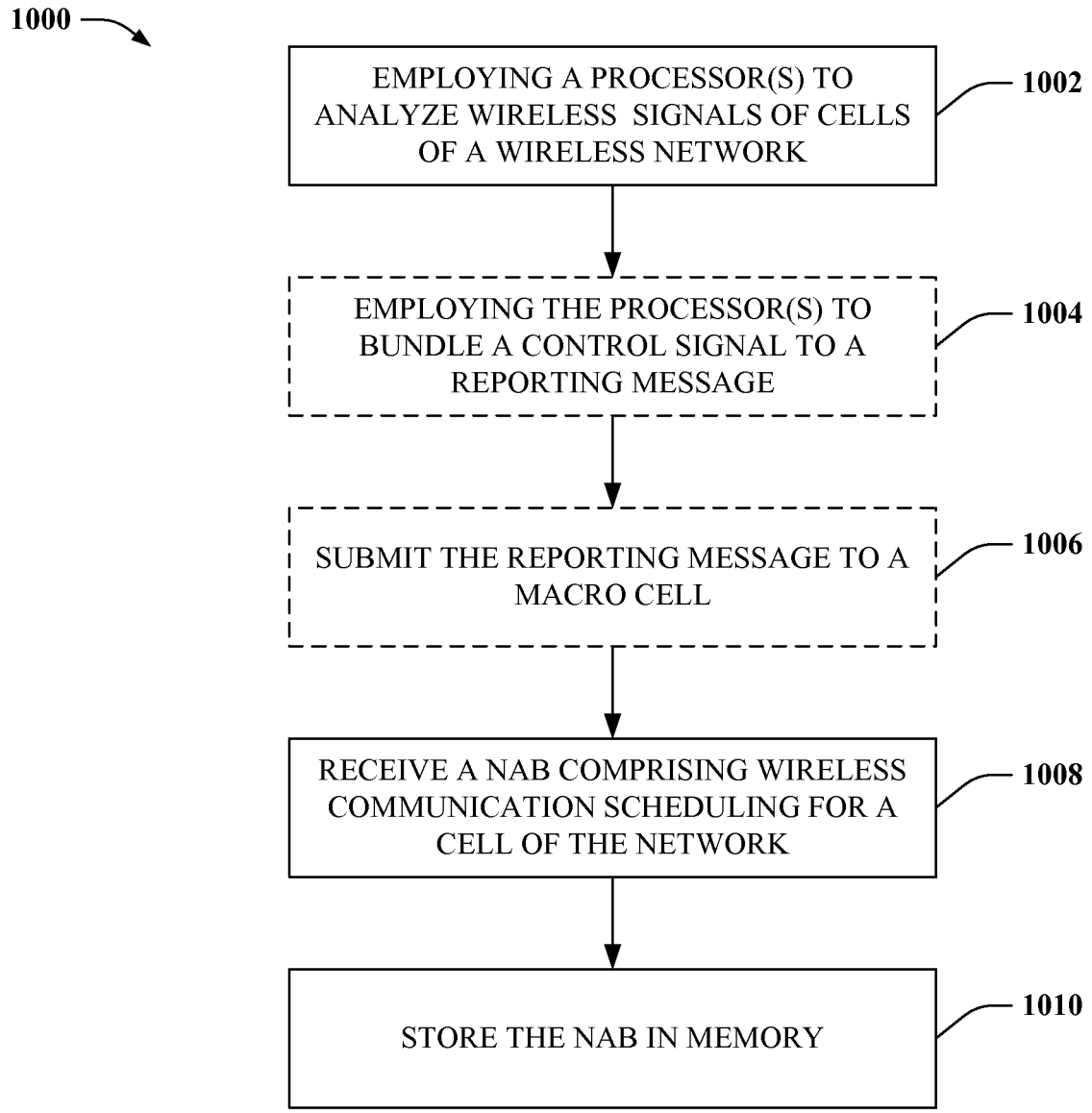
FIG. 10 depicts a flowchart of an example methodology for facilitating virtual scheduling in heterogeneous networks according to other disclosed aspects.

FIG. 10 depicts a flowchart of an example methodology 1000 for facilitating virtual scheduling of wireless communications according to further aspects of the subject disclosure. At 1002, method 1000 can employ a set of processors to analyze wireless signals of a plurality of cells of a wireless network. In some aspects of the subject disclosure, the wireless network is a heterogeneous network. In further aspects of the subject disclosure, at least one of the wireless signals is a control channel signal.

At 1004, method 1000 can optionally employ the processors to bundle at least one parameter into a cell reporting message. The bundled parameter can represent interference for at least one of the plurality of cells, current resource scheduling for the cell(s), transmit power level of traffic flows of the cell(s) or QoS commitments for such traffic flows, mobility management information (e.g., pilot signal report, APs of an active set), or transmit diversity information pertaining to a set of ATs within a cell(s), or a set of APs of such cells.

At 1006, method 1000 can optionally submit the reporting message to a macro base station providing wireless access to a macro coverage area of the wireless network. At 1008, method 1000 can receive a NAB message comprising wireless communication scheduling configured for a cell of the wireless network. The NAB message can comprise uplink communication assignments, downlink communication assignments, or both. Additionally, the NAB can be generated and transmitted by a centralized scheduler within the wireless network (e.g., the macro base station of the wireless network), and can be targeted toward any suitable cell of the wireless network, cells not served by the centralized scheduler, or cells having at least one AT that does not have the centralized scheduler in an active mobility set (e.g., a cell in which the centralized scheduler does not serve at least one AT).

In some aspects of the subject disclosure, the NAB message can comprise network resource scheduling, transmission power scheduling, traffic flow priority, or mobility management directions calculated by the macro base station. Additionally, the scheduling or directions can optionally be determined based on information submitted to the macro cell. At 1010, method 1000 can store the NAB message in memory for implementation of the scheduling information provided by the message. For instance, based on the information, specified RL traffic resources can be employed, a specified transmit power can be utilized, or mobility management decisions can be implemented. Because the scheduling can be calculated from information pertaining to multiple cells in the AP network, improved interference can result from such implementation, even in a semi or unplanned network environment.

Figure 11:
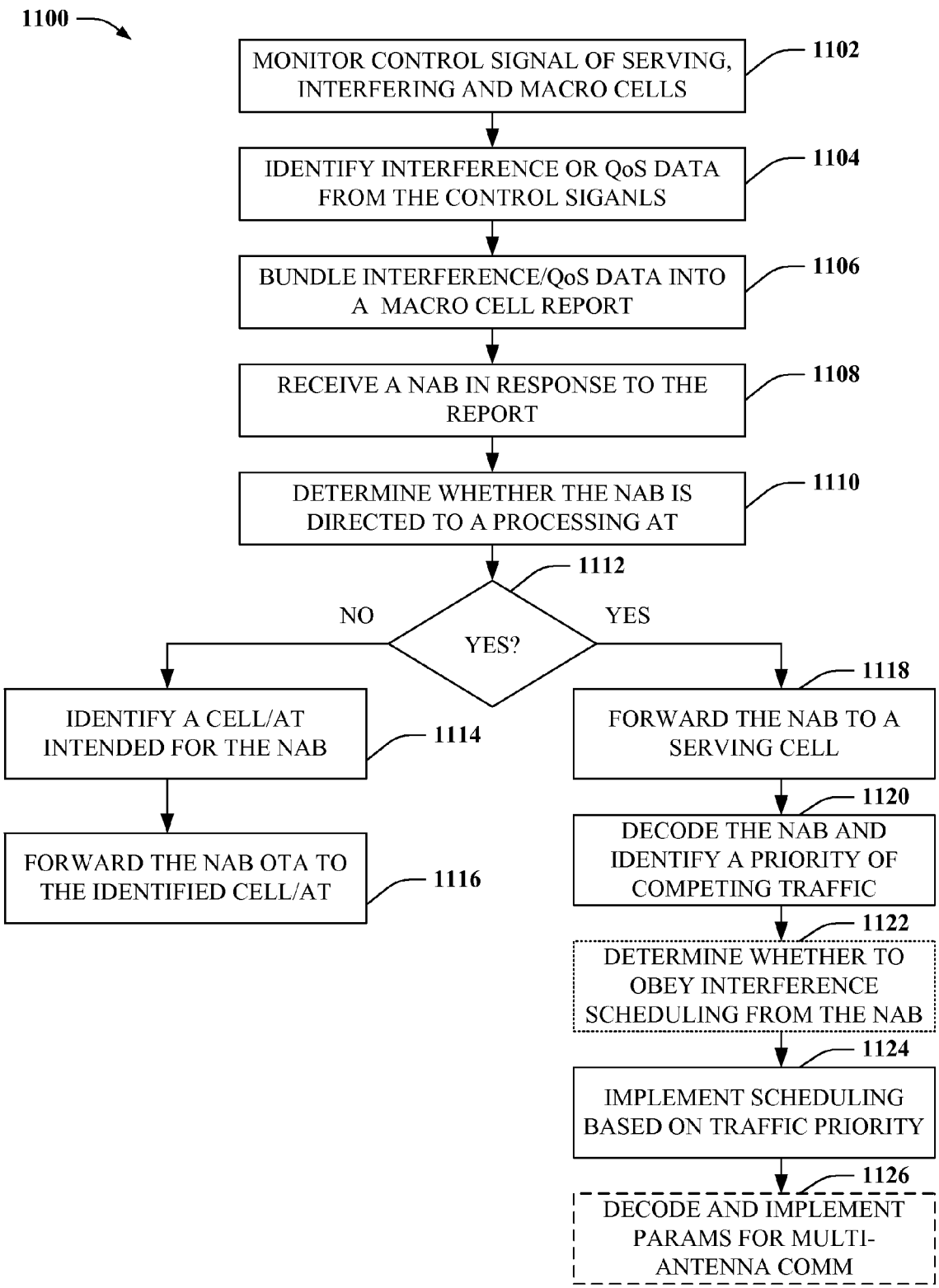
FIG. 11 illustrates a flowchart of a sample methodology for facilitating virtual scheduling and multiple-antenna communication in heterogeneous networks.

FIG. 11 illustrates a flowchart of an example methodology 1100 for facilitating reduced interference and improved throughput in wireless communications. At 1102, method 1100 can monitor control signals of neighboring access points to a wireless network. Particularly, the control signals can be associated with a serving cell or interfering cell, and a macro base station. At 1104, method 1100 can identify interference or QoS data from the control signals. At 1106, method 1100 can bundle the interference or QoS data into a macro cell reporting message. At 1108, method 1100 can receive a NAB message in response to the macro cell reporting message. At 1110, method 1100 can determine whether the NAB message is directed to an AT receiving the message. The determination can be based on whether an ID of the receiving AT or an ID of the serving cell is included within the NAB message.

At 1112, method 1100 can proceed to 1114 if the NAB message is not directed to the receiving AT; otherwise method 1100 can proceed to 1118. At 1114, method 1100 can identify a cell/AT targeted by the NAB message. At 1116, method 1100 can forward the NAB OTA to the identified cell or AT. For transmission to the cell, RL channel resources can be utilized. For transmission to the AT, FL peer-to-peer communication resources can be utilized instead. Method 1100 ends after forwarding the NAB message.

At 1118, method 1100 can forward the NAB message to the serving cell associated with the receiving AT. At 1120, method 1100 can decode the NAB and identify a priority of competing traffic. At 1122, method 1100 can determine whether to obey interference scheduling specified within the NAB message, based at least in part on the priority. The determination can further be based on a priority of traffic flows of the receiving AT, for instance. At 1124, method 1100 can implement scheduling specified by the NAB message, subject to or modified based on the priority. At 1126, method 1100 can optionally decode and implement parameters specified in the NAB message for multiple-antenna communication. The implementation can be based on identifying such parameters associated with an ID of the receiving AT. Additionally, the implementation can be subject to availability of a suitable other wireless node to participate in the multiple-antenna communication, as described herein.

Figure 12:
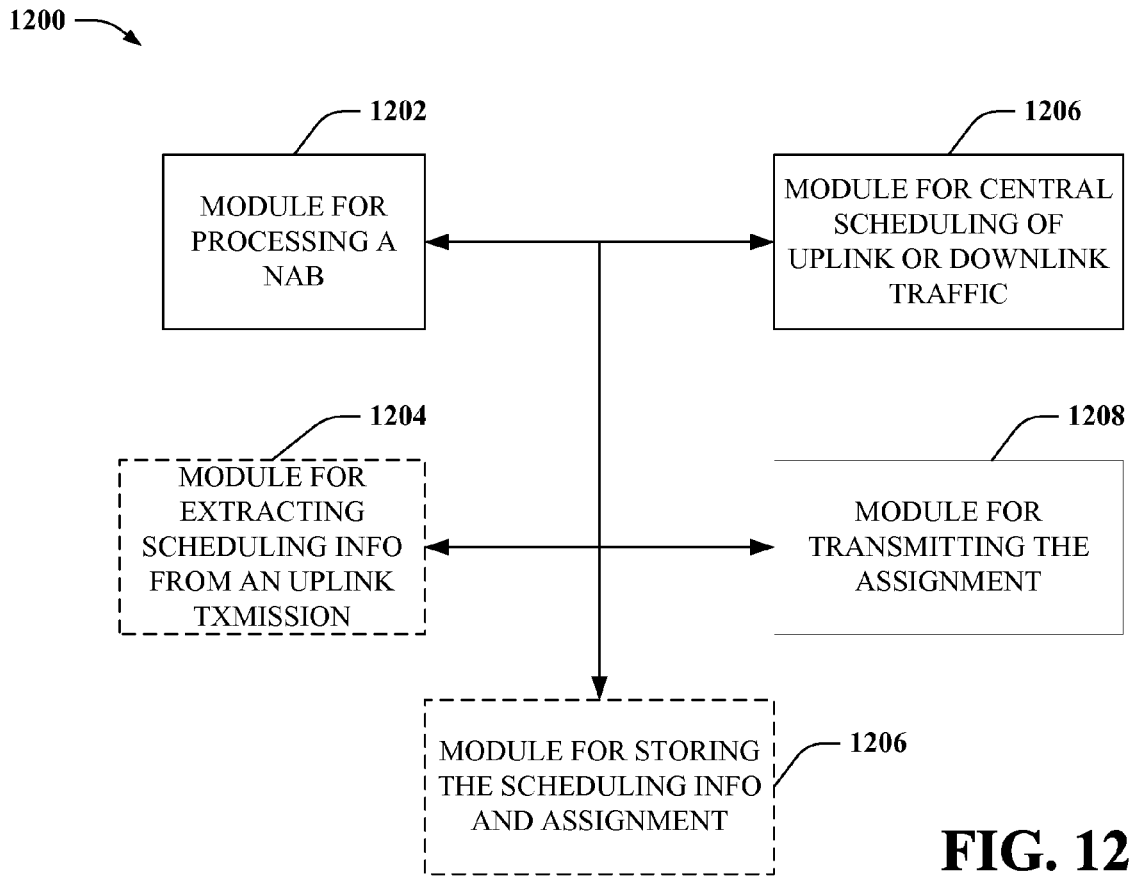
FIGS. 12 and 13 depict block diagrams for providing and facilitating, respectively, virtual scheduling in heterogeneous networks.
Figure 13:
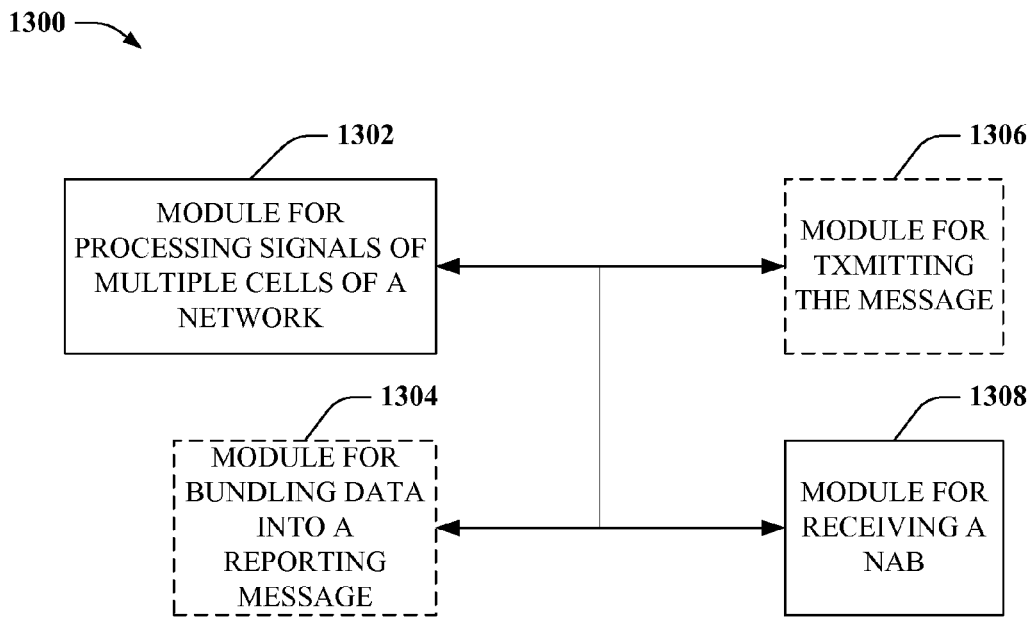

FIGS. 12 and 13 depict block diagrams of example systems 1200, 1300 for employing and facilitating, respectively, virtual scheduling in heterogeneous AP networks according to aspects of the subject disclosure. For example, systems 1200 and 1300 can reside at least partially within a wireless communication network and/or within a transmitter such as a node, base station, access point, user terminal, personal computer coupled with a mobile interface card, or the like. It is to be appreciated that systems 1200 and 1300 are represented as including functional blocks, which can be functional blocks that represent functions implemented by a processor, software, or combination thereof (e.g., firmware).

System 1200 can comprise a module 1202 for processing a NAB message for conveying wireless communication instructions for one or more wireless nodes in a wireless communication environment. The NAB message can be transmitted to such nodes OTA, utilizing broadcast or unicast control channels, for instance. Alternatively, or in addition, the NAB message can be transmitted to one or more such nodes via a dedicated wired or wireless connection, such as a backhaul. In some aspects, the NAB can include downlink communication assignments, whereas in other aspects, the NAB can include uplink communication assignments, or both uplink and downlink assignments. Additionally, the NAB can generate assignments for nodes in any cell of the wireless communication environment, cells neighboring system 1200, or cells in which system 1200 is not a serving cell (e.g., at least one AT does not have system 1200 in an active mobility set).

System 1200 can additionally optionally comprise a module 1204 for extracting scheduling information pertaining to cells of the communication environment from a received uplink transmission. Particularly, the information can pertain to at least one restricted access AP. The extracted scheduling information can be provided to a module 1206 for scheduling uplink or downlink wireless traffic. The scheduling can be calculated to implement mitigated interference, improved QoS, mobility management, transmit or receive diversity, multiple-antenna communication, and so forth. In one optional example, the module 1206 can employ the cell scheduling information to identify interference conditions within the cells, and nodes contributing to such interference. Based on the identified interference, resource selection or reduced power transmission can be employed for scheduling the wireless traffic to mitigate the interference. Module 1206 can encode the scheduled uplink or downlink wireless traffic into the NAB message generated by module 1202. A module 1208 for transmitting the scheduled traffic can then forward the NAB message to a target wireless node, via broadcast or unicast signaling, or to a neighboring cell via backhaul signaling.

System 1300 can comprise a module 1302 for concurrently monitoring and processing wireless signals (e.g., control channel signals) of multiple APs of a network. The multiple APs can comprise a serving AP, an interfering AP or a macro serving AP (e.g. associated with or comprising a centralized scheduling apparatus for a wireless network). In at least one aspect, the serving or interfering AP can comprise a femto base station. Additionally, system 1300 can optionally comprise a module 1304 for bundling at least one control signal parameter of an interfering AP into a cell reporting message. Another optional module 1306 can transmit the message to the macro serving AP. Additionally, the system 1300 can comprise a module 1308 for receiving a NAB message comprising uplink or downlink traffic scheduling. System 1300 can employ the NAB message to facilitate centralized traffic management in a wireless environment. Furthermore, by employing optional modules 1304 and 1306, the centralized traffic management can be implemented in a heterogeneous network, comprising base station deployments of which the wireless network may have limited or unreliable information.

Figure 14:
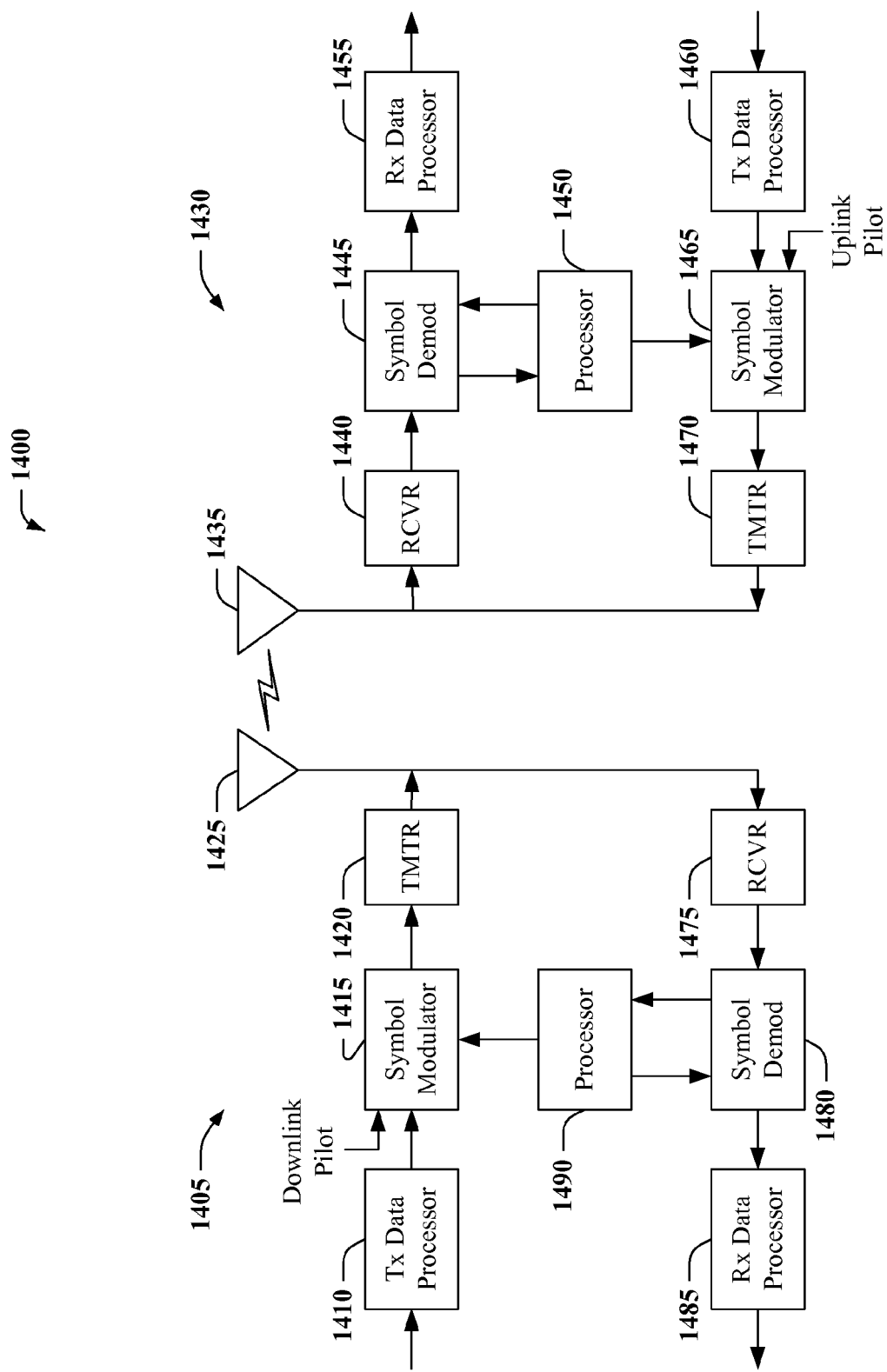
FIG. 14 illustrates a block diagram of a sample apparatus for wireless communications.

FIG. 14 depicts a block diagram of an example system 1400 that can facilitate wireless communication according to some aspects disclosed herein. On a downlink, at access point 1405, a transmit (TX) data processor 1410 receives, formats, codes, interleaves, and modulates (or symbol maps) traffic data and provides modulation symbols ("data symbols"). A symbol modulator 1415 receives and processes the data symbols and pilot symbols and provides a stream of symbols. A symbol modulator 1420 multiplexes data and pilot symbols and provides them to a transmitter unit (TMTR) 1420. Each transmit symbol can be a data symbol, a pilot symbol, or a signal value of zero. The pilot symbols can be sent continuously in each symbol period. The pilot symbols can be frequency division multiplexed (FDM), orthogonal frequency division multiplexed (OFDM), time division multiplexed (TDM), code division multiplexed (CDM), or a suitable combination thereof or of like modulation and/or transmission techniques.

TMTR 1420 receives and converts the stream of symbols into one or more analog signals and further conditions (e.g. amplifies, filters, and frequency upconverts) the analog signals to generate a downlink signal suitable for transmission over the wireless channel. The downlink signal is then transmitted through an antenna 1425 to the terminals. At terminal 1430, an antenna 1435 receives the downlink signal and provides a received signal to a receiver unit (RCVR) 1440. Receiver unit 1440 conditions (e.g., filters, amplifies, and frequency downconverts) the received signal and digitizes the conditioned signal to obtain samples. A symbol demodulator 1445 demodulates and provides received pilot symbols to a processor 1450 for channel estimation. Symbol demodulator 1445 further receives a frequency response estimate for the downlink from processor 1450, performs data demodulation on the received data symbols to obtain data symbol estimates (which are estimates of the transmitted data symbols), and provides the data symbol estimates to an RX data processor 1455, which demodulates (i.e., symbol demaps), deinterleaves, and decodes the data symbol estimates to recover the transmitted traffic data. The processing by symbol demodulator 1445 and RX data processor 1455 is complementary to the processing by symbol modulator 1415 and TX data processor 1410, respectively, at access point 1405.

On the uplink, a TX data processor 1460 processes traffic data and provides data symbols. A symbol modulator 1465 receives and multiplexes the data symbols with pilot symbols, performs modulation, and provides a stream of symbols. A transmitter unit 1470 then receives and processes the stream of symbols to generate an uplink signal, which is transmitted by the antenna 1435 to the access point 1405. Specifically, the uplink signal can be in accordance with SC-FDMA requirements and can include frequency hopping mechanisms as described herein.

At access point 1405, the uplink signal from terminal 1430 is received by the antenna 1425 and processed by a receiver unit 1475 to obtain samples. A symbol demodulator 1480 then processes the samples and provides received pilot symbols and data symbol estimates for the uplink. An RX data processor 1485 processes the data symbol estimates to recover the traffic data transmitted by terminal 1430. A processor 1490 performs channel estimation for each active terminal transmitting on the uplink. Multiple terminals can transmit pilot concurrently on the uplink on their respective assigned sets of pilot subbands, where the pilot subband sets can be interlaced.

Processors 1490 and 1450 direct (e.g., control, coordinate, manage, etc.) operation at access point 1405 and terminal 1430, respectively. Respective processors 1490 and 1450 can be associated with memory units (not shown) that store program codes and data. Processors 1490 and 1450 can also perform computations to derive frequency and impulse response estimates for the uplink and downlink, respectively.

For a multiple-access system (e.g., SC-FDMA, FDMA, OFDMA, CDMA, TDMA, etc.), multiple terminals can transmit concurrently on the uplink. For such a system, the pilot subbands can be shared among different terminals. The channel estimation techniques can be used in cases where the pilot subbands for each terminal span the entire operating band (possibly except for the band edges). Such a pilot subband structure would be desirable to obtain frequency diversity for each terminal. The techniques described herein can be implemented by various means. For example, these techniques can be implemented in hardware, software, or a combination thereof For a hardware implementation, which can be digital, analog, or both digital and analog, the processing units used for channel estimation can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes can be stored in memory unit and executed by the processors 1490 and 1450.

Figure 15:
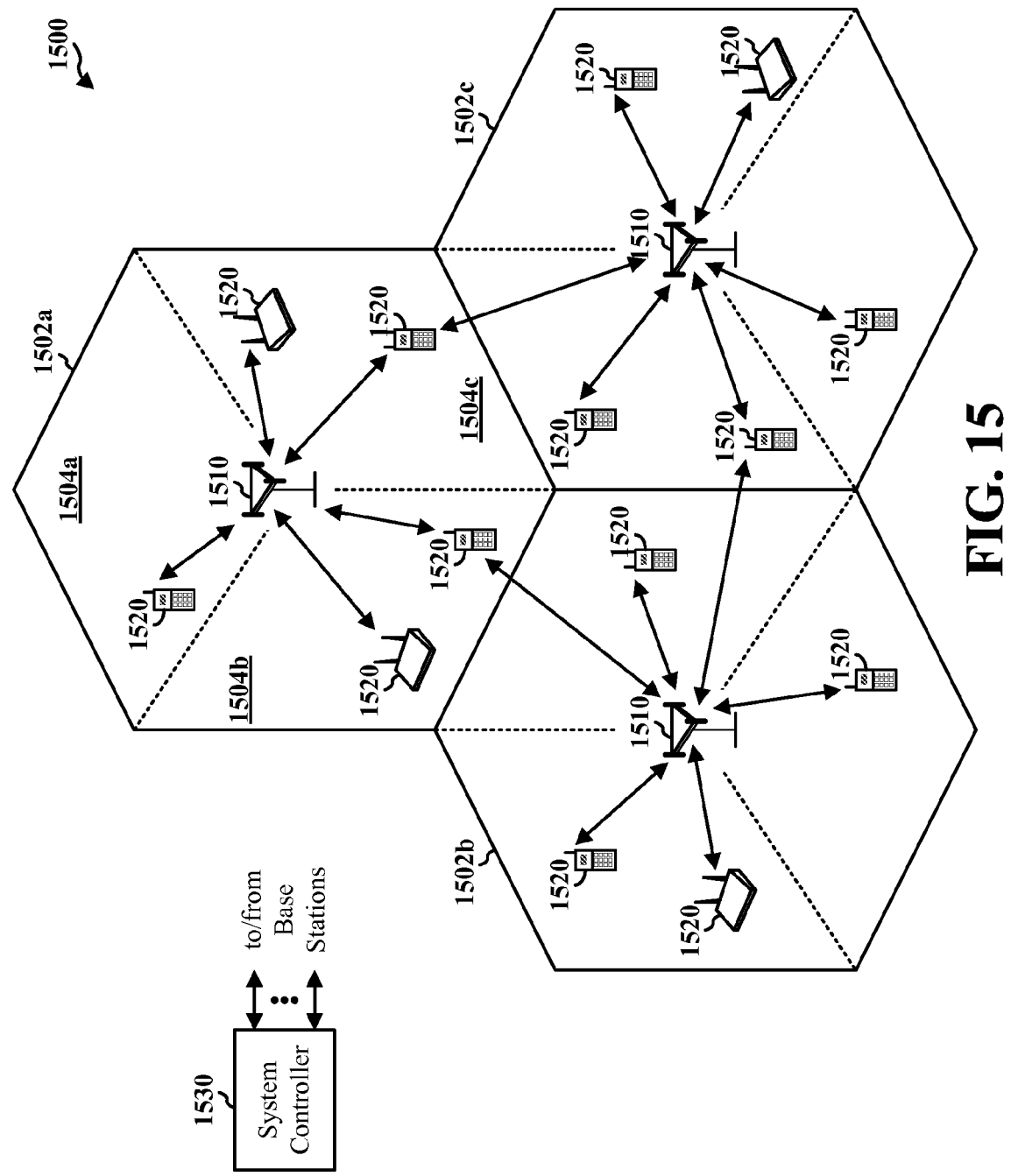
FIG. 15 depicts a block diagram of an example mobile communication environment according to aspects of the subject disclosure.

FIG. 15 illustrates a wireless communication system 1500 with multiple base stations (BSs) 1510 (e.g., wireless access points) and multiple terminals 1520 (e.g., UTs), such as can be utilized in conjunction with one or more aspects. A BS (1510) is generally a fixed station that communicates with the terminals and can also be called an access point, a Node B, or some other terminology. Each BS 1510 provides communication coverage for a particular geographic area or coverage area, illustrated as three geographic areas in FIG. 15, labeled 1502a, 1502b, and 1502c. The term "cell" can refer to a BS or its coverage area depending on the context in which the term is used. To improve system capacity, a BS geographic area/coverage area can be partitioned into multiple smaller areas (e.g., three smaller areas, according to cell 1502a in FIG. 15), 1504a, 1504b, and 1504c. Each smaller area 1504a, 1504b, 1504c) can be served by a respective base transceiver subsystem (BTS). The term "sector" can refer to a BTS or its coverage area depending on the context in which the term is used. For a sectorized cell, the BTSs for all sectors of that cell are typically co-located within the base station for the cell. The transmission techniques described herein can be used for a system with sectorized cells as well as a system with un-sectorized cells. For simplicity, in the subject description, unless specified otherwise, the term "base station" is used generically for a fixed station that serves a sector as well as a fixed station that serves a cell.

Terminals 1520 are typically dispersed throughout the system, and each terminal 1520 can be fixed or mobile. Terminals 1520 can also be called a mobile station, user equipment, a user device, or some other terminology, as described herein. A terminal 1520 can be a wireless device, a cellular phone, a personal digital assistant (PDA), a wireless modem card, and so on. Each terminal 1520 can communicate with zero, one, or multiple BSs 1510 on the downlink (e.g., FL) and uplink (e.g., RL) at any given moment. The downlink refers to the communication link from the base stations to the terminals, and the uplink refers to the communication link from the terminals to the base stations.

For a centralized architecture, a system controller 1530 couples to base stations 1510 and provides coordination and control for BSs 1510. For a distributed architecture, BSs 1510 can communicate with one another as needed (e.g., by way of a wired or wireless backhaul network communicatively coupling the BSs 1510). Data transmission on the forward link often occurs from one access point to one access terminal at or near the maximum data rate that can be supported by the forward link or the communication system. Additional channels of the forward link (e.g. control channel) can be transmitted from multiple access points to one access terminal. Reverse link data communication can occur from one access terminal to one or more access points.

Figure 16:
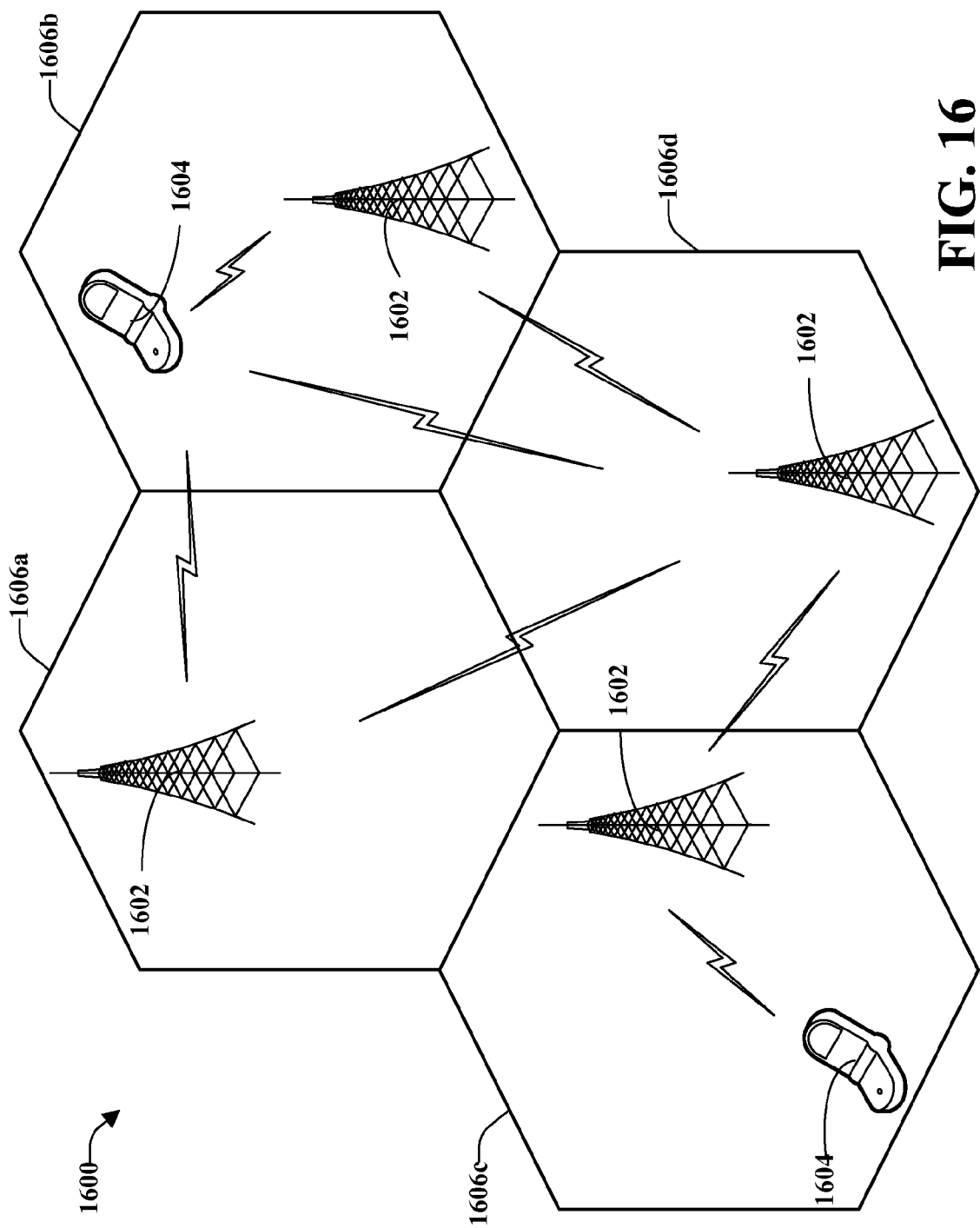
FIG. 16 illustrates a block diagram of a sample cellular communication environment according to further aspects of the subject disclosure.

FIG. 16 is an illustration of a planned or semi-planned wireless communication environment 1600, in accordance with various aspects. System 1600 can comprise one or more BSs 1602 in one or more cells and/or sectors that receive, transmit, repeat, etc., wireless communication signals to each other and/or to one or more mobile devices 1604. As illustrated, each BS 1602 can provide communication coverage for a particular geographic area, illustrated as four geographic areas, labeled 1606a, 1606b, 1606c and 1606d. Each BS 1602 can comprise a transmitter chain and a receiver chain, each of which can in turn comprise a plurality of components associated with signal transmission and reception (e.g., processors, modulators, multiplexers, demodulators, demultiplexers, antennas, and so forth, see FIG. 5), as will be appreciated by one skilled in the art. Mobile devices 1604 can be, for example, cellular phones, smart phones, laptops, handheld communication devices, handheld computing devices, satellite radios, global positioning systems, PDAs, and/or any other suitable device for communicating over wireless network 1600. System 1600 can be employed in conjunction with various aspects described herein in order to facilitate providing virtual scheduling in a heterogeneous wireless communication environment (1600), as set forth herein.

As used in the subject disclosure, the terms "component," "system," "module" and the like are intended to refer to a computer-related entity, either hardware, software, software in execution, firmware, middle ware, microcode, and/or any combination thereof. For example, a module can be, but is not limited to being, a process running on a processor, a processor, an object, an executable, a thread of execution, a program, a device, and/or a computer. One or more modules can reside within a process, or thread of execution; and a module can be localized on one electronic device, or distributed between two or more electronic devices. Further, these modules can execute from various computer-readable media having various data structures stored thereon. The modules can communicate by way of local or remote processes such as in accordance with a signal having one or more data packets (e.g. data from one component interacting with another component in a local system, distributed system, or across a network such as the Internet with other systems by way of the signal). Additionally, components or modules of systems described herein can be rearranged, or complemented by additional components/modules/systems in order to facilitate achieving the various aspects, goals, advantages, etc., described with regard thereto, and are not limited to the precise configurations set forth in a given figure, as will be appreciated by one skilled in the art.

Furthermore, various aspects are described herein in connection with a UT. A UT can also be called a system, a subscriber unit, a subscriber station, mobile station, mobile, mobile communication device, mobile device, remote station, remote terminal, access terminal (AT), user agent (UA), a user device, or user equipment (UE). A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In one or more exemplary embodiments, the functions described can be implemented in hardware, software, firmware, middleware, microcode, or any suitable combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media may be any physical media that can be accessed by a computer. By way of example, and not limitation, such computer storage media can comprise RAM, ROM, EEPROM, CD-ROM or other optical disk storage, magnetic disk storage or other magnetic storage devices, smart cards, and flash memory devices (e.g., card, stick, key drive . . . ), or any other medium that can be used to carry or store desired program code in the form of instructions or data structures and that can be accessed by a computer. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

For a hardware implementation, the processing units' various illustrative logics, logical blocks, modules, and circuits described in connection with the aspects disclosed herein can be implemented or performed within one or more ASICs, DSPs, DSPDs, PLDs, FPGAs, discrete gate or transistor logic, discrete hardware components, general purpose processors, controllers, micro-controllers, microprocessors, other electronic units designed to perform the functions described herein, or a combination thereof. A general-purpose processor can be a microprocessor, but, in the alternative, the processor can be any conventional processor, controller, microcontroller, or state machine. A processor can also be implemented as a combination of computing devices, e.g. a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps or actions of a method or algorithm can reside as at least one or any combination or set of codes or instructions on a machine-readable medium, or computer-readable medium, which can be incorporated into a computer program product. The term "article of manufacture" as used herein is intended to encompass a computer program accessible from any suitable computer-readable device or media.

Additionally, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, as used herein, the terms to "infer" or "inference" refer generally to the process of reasoning about or inferring states of the system, environment, or user from a set of observations as captured via events, or data. Inference can be employed to identify a specific context or action, or can generate a probability distribution over states, for example. The inference can be probabilistic-that is, the computation of a probability distribution over states of interest based on a consideration of data and events. Inference can also refer to techniques employed for composing higher-level events from a set of events, or data. Such inference results in the construction of new events or actions from a set of observed events and/or stored event data, whether or not the events are correlated in close temporal proximity, and whether the events and data come from one or several event and data sources.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A method for wireless communication in a wireless network, comprising:
    employing a set of processors to generate a network assignment block (NAB) for a neighboring cell of the wireless network based on instructions that cause the set of processors to obtain channel or interference information pertaining to the neighboring cell, wherein the channel or interference information is determined by an access terminal (AT);
    assign a downlink wireless communication for the neighboring cell based at least in part on the channel or interference information and include the downlink communication assignment in the NAB;
    specify in the NAB an ID of the neighboring cell, an ID of the AT, and a wireless resource for the downlink wireless communication; and
    initiate transmission of the NAB over-the-air (OTA) to the AT in a coverage area of the wireless network; and
    saving the instructions in a memory.

2. The method of claim 1, wherein the neighboring cell obtains the downlink assignment OTA from the AT and analyzes the downlink assignment to schedule traffic for the neighboring cell.

3. The method of claim 2, wherein the neighboring cell acquires interference-related information affecting the neighboring cell, and further employs the interference-related information to schedule the neighboring cell traffic.

4. The method of claim 1, further comprising obtaining traffic information of the neighboring cell from the AT or a backhaul link with the neighboring cell, wherein the downlink assignment is based on the traffic information.

5. The method of claim 1, further comprising specifying in the NAB a downlink channel resource, modulation and coding scheme, transmit power, antenna coefficients, spatial multiplexing mode or transmit diversity mode for the downlink scheduling.

6. The method of claim 1, further comprising specifying in the NAB an ID of a relay AT for forwarding the NAB to the neighboring cell.

7. The method of claim 1, further comprising:
    configuring the downlink communication as a multiple-antenna communication involving a plurality of neighboring cells or a plurality of ATs in the wireless network; and
    forwarding the downlink assignment to at least one of the plurality of neighboring cells via a backhaul link, or OTA to at least one of the plurality of ATs.

8. The method of claim 1, OTA transmission of the NAB further comprises at least one of unicast transmission to the AT; or broadcast transmission to ATs within the wireless network, wherein the wireless network comprises a coverage area of a macro base station.

9. The method of claim 1, further comprising:
    analyzing data provided by the AT or the neighboring cell to identify wireless resources assigned to traffic data served by the neighboring cell;
    adjusting the assignment of wireless resources for the traffic data to mitigate interference, improve traffic QoS or implement wireless diversity between the neighboring cell and another cell of the wireless network; and
    transmitting the adjusted assignment to the neighboring cell over a backhaul link or OTA via the AT.

10. The method of claim 1, further comprising transmitting a multi-antenna communication stream, or decoding a received multi-antenna communication, in conjunction with the neighboring cell in a manner specified by the NAB.

11. An apparatus for coordinated communications in a wireless communication environment, comprising:
   at least one antenna; and
   a set of processors configured to obtain channel or interference information pertaining to a neighboring cell, wherein the channel or interference information is determined by an access terminal (AT); schedule downlink wireless communication for the neighboring cell of a wireless network based on the channel or interference information; encode scheduling data for the downlink communication into a network assignment block (NAB); specify in the NAB an ID of the neighboring cell, an ID of the AT, and a wireless resource for downlink wireless communication; and employ the at least one antenna to forward the NAB to the neighboring cell OTA via the AT served by the wireless network.

12. The apparatus of claim 11, wherein the set of processors is further configured to employ the at least one antenna to obtain data pertaining to at least one neighboring cell of the wireless network from an uplink message and to specify in the NAB a downlink channel resource, modulation and coding scheme, transmit power, antenna coefficients, spatial multiplexing mode or transmit diversity mode for the downlink communication, based on the data.

13. The apparatus of claim 12, wherein employing the at least one antenna to forward the NAB to the neighboring cell OTA via an AT served by the wireless network comprises at least one of sending the NAB to the AT in a unicast transmission; or sending the NAB to a set of ATs within the wireless network in a broadcast transmission.

14. The apparatus of claim 11, wherein the set of processors is further configured to calculate respective parameters for a plurality of neighboring cell access points or a plurality of ATs within the wireless network to implement distributed multiple input (MI), multiple output (MO), or multiple input multiple output (MIMO) communication.

15. The apparatus of claim 11, wherein the set of processors is further configured to specify in the NAB an ID of the AT and cell serving the AT, wherein the downlink communication at least in part involves the AT or serving cell; or specify in the NAB an ID of the AT and an ID of the neighboring cell, wherein the scheduling data is forwarded to the neighboring cell by the AT.

16. The apparatus of claim 11, wherein the set of processors is further configured to determine a priority for traffic data associated with the AT or with the neighboring cell and specifies the priority in the NAB; or obtain a priority for interfering traffic data associated with a second neighboring cell and generates the downlink communication based on the interfering traffic priority and a priority of traffic involving the AT.

17. The apparatus of claim 11, wherein the apparatus comprises at least one of a macro cell; a micro cell; a pico cell; a restricted access femto cell; or a wireless relay.

18. The apparatus of claim 11, wherein the set of processors:
   analyzes data provided by the AT or the neighboring cell to identify wireless resources assigned to traffic data served by the neighboring cell;
   adjusts the assignment of wireless resources based on a priority of the traffic to mitigate interference, improve QoS or provide wireless diversity in the neighboring cell or a second neighboring cell; and
   transmits the adjusted assignment to the neighboring cell via a backhaul link or OTA via the AT.

19. An apparatus for wireless communication in a wireless network, comprising:
   means for processing instruction code to generate a network assignment block (NAB) for a neighboring cell of a wireless network, wherein the instruction code causes the means for processing to obtain channel or interference information pertaining to the neighboring cell, wherein the channel or interference information is determined by an access terminal (AT); assign a downlink wireless communication for the neighboring cell based at least in part on the channel or interference information and include the downlink assignment in the NAB; specify in the NAB an ID of the neighboring cell, an ID of the AT, and a wireless resource for the downlink wireless communication; and initiate transmission of the NAB over the air (OTA) to the AT in a coverage area of the wireless network; and
   means for storing the instruction code in memory.

20. At least one processor configured for wireless communication in a wireless network, comprising:
   a first module for processing instruction code to generate a network assignment block (NAB) for a neighboring cell of the wireless network;
   a second module for obtaining channel or interference information pertaining to the neighboring cell, wherein the channel or interference information is determined by an access terminal (AT);
   a third module for assigning a downlink wireless communication for the neighboring cell based at least in part on the channel or interference information and including the downlink assignment in the NAB;
   a fourth module for specifying in the NAB an ID of the neighboring cell, an ID of the AT, and a wireless resource for the downlink wireless communication; and
   a fifth module for initiating transmission of the assignment over the air (OTA) to the AT in a coverage area of the wireless network.

21. A computer program product, comprising:
   a non-transitory computer-readable medium, comprising:
   a first set of codes for causing a computer to generate a network assignment block (NAB) for a neighboring cell of a wireless network;
   a second set of codes for causing the computer to obtain channel or interference information pertaining to the neighboring cell, wherein the channel or interference information is determined by an access terminal (AT);
   a third set of codes for causing the computer to assign a downlink wireless communication for the neighboring cell and include the downlink assignment in the NAB;
   a fourth set of codes for causing the computer to specify in the NAB an ID of the neighboring cell, an ID of the AT, and a wireless resource for the downlink wireless communication; and
   a fifth set of codes for causing the computer to transmit the NAB over the air (OTA) to the AT in a coverage area of the wireless network.

22. A method for facilitating wireless communication in a wireless network, comprising:
   employing, by an access terminal (AT), at least one processor to analyze respective wireless signals of a serving base station and of a second wireless device within the wireless network;
   obtaining, by the AT, a network assignment block (NAB) based on the analyzed wireless signals, the NAB specifying a downlink wireless communication scheduling configured for a cell of the wireless network, an ID of the serving base station or the second wireless device, an ID of the AT, and a wireless resource; and transmitting, by the AT, the downlink wireless communication scheduling to the serving base station or a non-serving cell of the wireless network to facilitate AT-directed scheduling of the wireless communication.

23. The method of claim 22, further comprising employing a network assignment indication (NAI) channel or message to transmit the downlink wireless communication scheduling to the serving base station or non-serving cell.

24. The method of claim 22, wherein the NAB further includes mobility management instructions for an AT of the wireless network.

25. The method of claim 22, further comprising extracting an ID of the serving cell or the non-serving cell from the NAB to determine a recipient of the downlink wireless communication scheduling.

26. The method of claim 22, further comprising:
identifying wireless channel information pertaining to the serving base station from the analyzed signals; and
forwarding the wireless channel information to the second wireless device to facilitate generating the downlink wireless communication scheduling based on the channel information.

27. The method of claim 22, wherein the NAB comprises a downlink channel resource, modulation and coding scheme, transmit power, spatial mode, spatial multiplexing mode or transmit diversity mode for the serving cell.

28. The method of claim 22, wherein the NAB further comprises uplink scheduling for the serving base station or the non-serving cell and an ID of one or more nodes of the wireless network for the uplink scheduling.

29. The method of claim 28, further comprising at least one of transmitting the downlink wireless communication scheduling to respective base stations of the wireless network configured for multiple-antenna communication to implement multiple input (MI) or multiple input multiple output (MIMO) communication; or transmitting the uplink scheduling to respective nodes identified from the ID(s) to implement distributed multiple output (MO) or MIMO communication.

30. The method of claim 22, further comprising reporting interference levels resulting from the signal analysis to the second wireless device to facilitate mitigated interference in the wireless network.

31. The method of claim 22, further comprising decoding the NAB and obtaining a priority for traffic within the serving base station or interfering traffic within the non-serving cell.

32. An apparatus for facilitating wireless communication in a wireless network, comprising:
a set of antennas for sending and receiving wireless signals;
a processor for analyzing respective wireless signals of a serving base station and of a second wireless device within the wireless network;
a receiver that obtains a network assignment block (NAB) based on the analyzed wireless signals, the NAB specifying downlink wireless communication scheduling configured for the serving base station, an ID of the serving base station or the second wireless device, an ID of the AT, and a wireless resource; and
a reporting module that transmits the downlink wireless communication scheduling to the serving base station or a non-serving cell of the wireless network.

33. The apparatus of claim 32, wherein the reporting module employs an NAI channel or message to transmit the downlink wireless communication scheduling.

34. The apparatus of claim 32, wherein the NAB further includes mobility management instructions for the apparatus.

35. The apparatus of claim 32, further comprising a mobility module that includes a pilot report or an active set of APs in a cell reporting message transmitted to the second wireless device to facilitate network-managed mobility for the apparatus.

36. The apparatus of claim 32, wherein:
the processor extracts wireless channel information from at least one of the analyzed signals; and
the reporting module forwards the wireless channel information to the second wireless device to facilitate centralized network scheduling for the serving base station or non-serving cell based on the wireless channel information.

37. The apparatus of claim 32, wherein:
the processor extracts the downlink wireless communication scheduling from the NAB; and
the reporting module transmits the downlink wireless communication information to the non-serving cell to facilitate OTA relay scheduling for the wireless network.

38. The apparatus of claim 32, wherein the NAB further comprises uplink scheduling for traffic associated with the apparatus.

39. The apparatus of claim 32, further comprising a shared communication module that employs the downlink wireless communication scheduling to implement multi-antenna communication between the apparatus and a wireless transceiver, wherein the reporting module forwards the downlink wireless communication scheduling to the wireless transceiver.

40. The apparatus of claim 39, wherein the wireless transceiver is an AT within the serving cell, a wireless relay, or an AP of the serving base station or non-serving cell.

41. The apparatus of claim 32, further comprising a mediation module operable to decode the NAB and to obtain priority for interfering traffic within the serving base station or the non-serving cell.

42. The apparatus of claim 41, wherein the apparatus forwards the priority for interfering traffic to the serving base station or non-serving cell for managed priority scheduling at the base station or cell.

43. An apparatus for facilitating wireless communication in a wireless network, comprising:
means for employing at least one processor to analyze respective wireless signals of a serving base station and of a second wireless device within the wireless network;
means for obtaining a network assignment block (NAB) based on the analyzed wireless signals, the NAB specifying downlink wireless communication scheduling configured for the serving cell, an ID of the serving base station or the second wireless device, an ID of the AT, and a wireless resource; and
means for transmitting the downlink wireless communication scheduling to the serving base station or a non-serving cell of the wireless network to facilitate access terminal (AT)-directed scheduling of the wireless communication.

44. At least one processor for facilitating wireless communication in a wireless network, comprising:
a first module for analyzing respective wireless signals of a serving base station and of a second wireless device in the wireless network;

a second module for obtaining a network assignment block (NAB) based on the analyzed wireless signals, the NAB specifying downlink communication scheduling configured for a cell of the wireless network, an ID of the serving base station or the second wireless device, an ID of the AT, and a wireless resource; and a third module for transmitting the downlink wireless communication scheduling to the serving base station or a non-serving cell of the wireless network to facilitate access terminal (AT)-directed scheduling of the wireless communication.

45. A computer program product, comprising:

a non-transitory computer-readable medium, comprising:

a first set of codes for causing a computer to analyze respective wireless signals of a serving base station and of a second wireless device in a wireless network;

a second set of codes for causing the computer to obtain a network assignment block (NAB) based on the analyzed wireless signals, wherein the NAB specifies downlink wireless communication scheduling configured for a cell of the wireless network, an ID of the serving base station or the second wireless device, an ID of the AT, and a wireless resource; and a third set of codes for causing the computer to transmit the downlink wireless communication scheduling to the serving base station or a non-serving cell of the wireless network to facilitate access terminal (AT) directed scheduling of the wireless communication.

46. A method for wireless communication in a wireless network, comprising:

generating in a wireless network node a network assignment block (NAB) for a neighboring cell of the wireless network based on information pertaining to the neighboring cell determined and reported by an access terminal (AT);

determining a downlink wireless communication assignment for the neighboring cell based on the reported information and including the downlink wireless communication assignment in the NAB;

specifying in the NAB an ID of the neighboring cell, an ID of the AT, and a wireless resource for the downlink wireless communication assignment; and initiating transmission of the NAB over-the-air (OTA) to at least one AT in a coverage area of the wireless network.

47. The method of claim 46, wherein the information pertaining to the neighboring cell determined and reported by an access terminal (AT) is based on channel or interference information pertaining to the neighboring cell.

\* \* \* \* \*